United States Patent
Huebsch et al.

(10) Patent No.: US 12,454,822 B2
(45) Date of Patent: Oct. 28, 2025

(54) FOAM ENVELOPE FOR SEALING LARGE VOLUMES

(71) Applicants: DUPONT SAFETY & CONSTRUCTION, INC., Wilmington, DE (US); DDP SPECIALTY ELECTRONIC MATERIALS US, LLC, Wilmington, DE (US)

(72) Inventors: Eric Huebsch, Medingen (LU); Lars Massueger, Zurich (CH); Cedric Thomi, Sezenove (CH)

(73) Assignees: DDP SPECIALTY ELECTRONIC MATERIALS US, LLC, Wilmington, DE (US); DUPONT SAFETY & CONSTRUCTION, INC., Wilmington, DE (US)

( * ) Notice: Subject to any disclaimer, the term of this patent is extended or adjusted under 35 U.S.C. 154(b) by 307 days.

(21) Appl. No.: 18/136,644

(22) Filed: Apr. 19, 2023

(65) Prior Publication Data
US 2024/0352727 A1    Oct. 24, 2024

Related U.S. Application Data

(60) Provisional application No. 63/460,062, filed on Apr. 18, 2023.

(51) Int. Cl.
*E06B 1/62*    (2006.01)
*B32B 1/08*    (2006.01)
(Continued)

(52) U.S. Cl.
CPC .............. *E04B 1/6816* (2013.01); *B32B 1/08* (2013.01); *B32B 5/022* (2013.01); *B32B 5/267* (2021.05);
(Continued)

(58) Field of Classification Search
CPC .... E04B 1/6816; E04B 1/6812; E04B 1/6807; E04B 1/6813; E04B 1/6815;
(Continued)

(56) References Cited

U.S. PATENT DOCUMENTS 1,644,914 A * 10/1927 De La Mare ......... E04B 1/6807
404/47
3,310,615 A * 3/1967 Bender ............... F16L 55/1003
166/179

(Continued)

FOREIGN PATENT DOCUMENTS

CA     2832183 C  *  9/2019  .......... B29C 44/182
CH    701639 A2  *  2/2011  .......... E04B 1/6816
(Continued)

OTHER PUBLICATIONS

PCT International Search Report for Application No. PCT/US2023/018593; ISA/EPO; Jul. 5, 2023.
(Continued)

*Primary Examiner* — Ryan D Kwiecinski

(57) ABSTRACT

An article comprises a tube having peripheral areas, including an upper section, a lower section, an inner section, and an outer section, the tube further comprising a tube wall having an inner layer and an outer layer, the inner layer being a semipermeable membrane that is permeable to vapors but impermeable to liquids and the outer layer being a nonwoven fabric, and the tube further comprising at least one inlet port integrated into the tube wall to permit the flow of an activated or activatable foamable composition into the tube interior, wherein the tube further has a plurality of holes that penetrate through the inner and outer layers of the tube to allow expanding foam to both fill the interior of the tube and exit the tube and fill a space exterior to the tube.

13 Claims, 13 Drawing Sheets

(51) Int. Cl.
*B32B 5/02* (2006.01)
*B32B 5/26* (2006.01)
*B32B 27/08* (2006.01)
*B32B 27/32* (2006.01)
*E04B 1/68* (2006.01)

(52) U.S. Cl.
CPC .............. *B32B 27/08* (2013.01); *B32B 27/32* (2013.01); *B32B 2250/02* (2013.01); *B32B 2307/724* (2013.01); *B32B 2307/7265* (2013.01); *B32B 2581/00* (2013.01); *E04B 2001/6818* (2013.01)

(58) Field of Classification Search
CPC ..... E04B 2001/6818; B32B 1/08; E06B 1/62; E06B 2001/626
USPC ........................................................ 52/741.4
See application file for complete search history.

(56) References Cited

U.S. PATENT DOCUMENTS

| | | | | |
|---|---|---|---|---|
| 3,603,055 | A * | 9/1971 | Dale | E04B 1/6813 52/396.06 |
| 3,607,492 | A * | 9/1971 | Keith | F16L 9/16 156/149 |
| 3,946,762 | A * | 3/1976 | Green | A01G 25/06 405/44 |
| 4,139,159 | A * | 2/1979 | Inoue | A01C 23/04 428/36.1 |
| 4,153,080 | A * | 5/1979 | Murray, Jr. | F16L 11/02 239/34 |
| 4,204,373 | A * | 5/1980 | Davidson | E06B 1/64 52/127.7 |
| 4,206,786 | A * | 6/1980 | Wetmore | B29C 61/065 138/140 |
| 4,474,330 | A * | 10/1984 | Langa | A01G 25/02 239/542 |
| 4,600,615 | A * | 7/1986 | Hyodo | B29C 48/34 138/146 |
| 4,722,479 | A * | 2/1988 | Koob | E04B 1/6816 239/570 |
| 4,723,579 | A * | 2/1988 | Hyodo | B29C 63/343 138/119 |
| 4,790,544 | A * | 12/1988 | Kemp | H02G 15/013 277/605 |
| 4,926,585 | A * | 5/1990 | Dreschel | A01G 31/02 47/64 |
| 4,929,303 | A * | 5/1990 | Sheth | B32B 5/022 156/244.11 |
| 5,042,532 | A * | 8/1991 | Gilleland | F16L 55/18 138/97 |
| 5,056,282 | A * | 10/1991 | Pflieger | E04B 1/6816 138/97 |
| 5,072,952 | A * | 12/1991 | Irrgeher | E04B 1/6812 49/498.1 |
| 5,093,055 | A | 3/1992 | Skiff | |
| 5,164,237 | A * | 11/1992 | Kaneda | F16L 55/1656 428/36.1 |
| 5,186,215 | A * | 2/1993 | Gilleland | F16L 55/18 29/402.09 |
| 5,234,751 | A * | 8/1993 | Harada | C08J 5/18 428/315.7 |
| 5,297,582 | A * | 3/1994 | Kitajima | F16L 55/10 405/184.2 |
| 5,322,653 | A * | 6/1994 | Muller | F16L 55/163 264/269 |
| 5,328,647 | A * | 7/1994 | Koob | E04B 1/6816 264/36.17 |
| 5,334,429 | A * | 8/1994 | Imoto | B29C 63/34 428/36.2 |
| 5,351,720 | A * | 10/1994 | Maimets | F16L 55/163 285/15 |
| 5,385,173 | A * | 1/1995 | Gargiulo | E03F 3/06 405/184.2 |
| 5,494,301 | A * | 2/1996 | Hamilton | B29C 55/005 277/944 |
| 5,551,706 | A * | 9/1996 | Barna | F16J 15/022 277/609 |
| 5,560,974 | A * | 10/1996 | Langley | B32B 27/12 428/315.7 |
| 5,566,719 | A * | 10/1996 | Kamiyama | F16L 55/179 156/287 |
| 5,620,143 | A * | 4/1997 | Delmer | A01G 25/02 239/562 |
| 5,698,056 | A * | 12/1997 | Kamiyama | B29C 66/43 156/218 |
| 5,699,902 | A * | 12/1997 | Sperry | B29C 44/183 206/219 |
| 5,779,847 | A * | 7/1998 | Groeger | B01D 39/083 427/244 |
| 5,789,047 | A * | 8/1998 | Sasaki | B29C 53/8083 428/36.5 |
| 5,839,659 | A * | 11/1998 | Murray | A01G 25/06 239/145 |
| 5,931,474 | A * | 8/1999 | Chang | B62D 29/002 277/316 |
| 6,044,869 | A * | 4/2000 | Koob | E04B 1/6816 138/123 |
| 6,268,031 | B1 * | 7/2001 | Bleibler | E04B 1/6816 264/209.6 |
| 6,446,383 | B1 * | 9/2002 | Hoshall | A01M 1/245 43/132.1 |
| 6,783,345 | B2 * | 8/2004 | Morgan | E04B 2/7411 383/44 |
| 7,596,972 | B2 * | 10/2009 | Knight, Sr. | D04B 1/025 66/194 |
| 8,006,844 | B2 * | 8/2011 | McKinley | B65D 81/051 206/219 |
| 8,714,206 | B2 * | 5/2014 | Jackson | B29C 45/14336 138/146 |
| 8,800,650 | B2 * | 8/2014 | Spray | E21B 17/00 166/207 |
| 8,882,483 | B2 * | 11/2014 | O'Leary | E04B 1/7604 425/4 R |
| 9,427,902 | B2 * | 8/2016 | Werner | B29C 44/18 |
| 9,499,970 | B2 * | 11/2016 | Milo | E04B 1/165 |
| 9,523,232 | B2 * | 12/2016 | Han | E06B 1/58 |
| 9,561,606 | B2 * | 2/2017 | O'Leary | E04B 1/26 |
| 9,962,900 | B2 * | 5/2018 | Ueda | B32B 1/08 |
| 9,994,403 | B2 * | 6/2018 | Logan | F16L 11/12 |
| 10,036,178 | B2 * | 7/2018 | Ore | B29C 44/181 |
| 10,384,378 | B2 * | 8/2019 | O'Leary | E04B 1/7654 |
| 10,584,564 | B2 * | 3/2020 | Sherman | E21B 29/10 |
| 11,105,455 | B2 * | 8/2021 | Stark | F16L 55/1656 |
| 11,255,094 | B2 * | 2/2022 | Davlin | E04F 21/085 |
| 11,255,148 | B2 * | 2/2022 | Greci | E21B 33/12 |
| 11,585,188 | B2 * | 2/2023 | Sherman | E21B 41/00 |
| 11,885,118 | B1 * | 1/2024 | Neiman | E04B 1/6179 |
| 2002/0092279 | A1 * | 7/2002 | Sperry | B29C 65/7433 53/374.4 |
| 2004/0065445 | A1 * | 4/2004 | Abercrombie Simpson | E21B 41/0042 166/207 |
| 2005/0029148 | A1 * | 2/2005 | Rust | B65D 81/3272 206/523 |
| 2005/0166451 | A1 * | 8/2005 | Stachnik | A01G 9/025 47/65.7 |
| 2008/0277012 | A1 * | 11/2008 | Anders | F16L 55/1651 138/146 |
| 2010/0012214 | A1 * | 1/2010 | Kamiyama | F16L 55/1656 405/184.2 |
| 2012/0261053 | A1 * | 10/2012 | O'Leary | B29C 44/188 156/383 |
| 2012/0263817 | A1 | 10/2012 | O'Leary et al. | |
| 2013/0082413 | A1 * | 4/2013 | Ui | B29C 44/188 264/46.7 |
| 2015/0014934 | A1 * | 1/2015 | Ui | F16J 15/022 277/316 |

(56) References Cited

U.S. PATENT DOCUMENTS

| | | | | |
|---|---|---|---|---|
| 2020/0190831 A1* | 6/2020 | Davlin | ............... | E04B 1/7604 |
| 2021/0198411 A1* | 7/2021 | Orf | ............... | E04B 1/7604 |
| 2023/0039720 A1* | 2/2023 | Commerford | ........ | A01M 1/245 |
| 2023/0339153 A1* | 10/2023 | Huebsch | ............... | B32B 5/18 |
| 2023/0340777 A1* | 10/2023 | Huebsch | ............... | B29C 44/188 |
| 2023/0340778 A1* | 10/2023 | Huebsch | ............... | E04B 1/6812 |
| 2024/0117627 A1* | 4/2024 | Huebsch | ............... | E04B 1/6812 |
| 2024/0352725 A1* | 10/2024 | Huebsch | ............... | E04B 1/6812 |
| 2024/0352726 A1* | 10/2024 | Huebsch | ............... | E04B 1/6812 |
| 2024/0352727 A1* | 10/2024 | Huebsch | ............... | B32B 27/32 |
| 2024/0352728 A1* | 10/2024 | Huebsch | ............... | B32B 3/266 |

FOREIGN PATENT DOCUMENTS

| | | | | |
|---|---|---|---|---|
| CN | 110375072 A * | 10/2019 | ............ | E04B 1/6813 |
| CN | 113931328 A * | 1/2022 | | |
| CN | 118327165 A * | 7/2024 | | |
| DE | 3038524 A1 | 4/1982 | | |
| DE | 3929848 A * | 3/1991 | ............ | E04B 1/6816 |
| DE | 9207498 U1 | 7/1992 | | |
| DE | 4230547 A1 * | 3/1994 | ............ | E04B 1/648 |
| DE | 29719406 U1 * | 1/1998 | ............ | E04B 1/6816 |
| DE | 19632982 A1 * | 2/1998 | ............ | E04B 1/6816 |
| DE | 19702248 A1 * | 7/1998 | ............ | E04B 1/6806 |
| DE | 29805133 U1 * | 1/1999 | ............ | E04B 1/6816 |
| DE | 10333634 A1 * | 2/2005 | ............ | E06B 1/62 |
| DE | 202005015022 U1 * | 1/2006 | ............ | E04B 1/6816 |
| DE | 102004059522 A1 * | 6/2006 | ............ | C09J 7/026 |
| DE | 102005002123 A1 * | 7/2006 | ............ | E04B 1/6812 |
| DE | 202006004638 U1 * | 7/2006 | ............ | E04B 1/6816 |
| DE | 202009011357 U1 * | 2/2011 | ............ | E04B 1/6803 |
| DE | 202011000594 U1 * | 8/2012 | ............ | E04B 1/6812 |
| DE | 202011051055 U1 | 8/2012 | | |
| EP | 125696 A * | 11/1984 | ............ | E04B 1/6816 |
| EP | 323589 A * | 7/1989 | ............ | E04B 1/6812 |
| EP | 0436145 A2 | 7/1991 | | |
| EP | 522327 A1 * | 1/1993 | ............ | E04B 1/6816 |
| EP | 866190 A2 * | 9/1998 | ............ | E04B 1/6813 |
| EP | 1236835 A1 * | 9/2002 | ............ | B29C 44/04 |
| EP | 1867904 A1 * | 12/2007 | ............ | F16L 5/10 |
| EP | 3392422 A1 * | 10/2018 | ............ | E01D 19/06 |
| EP | 3474403 A1 * | 4/2019 | | |
| EP | 3608496 A1 * | 2/2020 | ............ | B32B 5/18 |
| FI | 97905 B * | 11/1996 | ............ | E04B 1/6807 |
| FR | 2746480 A1 * | 9/1997 | ............ | F16L 59/14 |
| GB | 2228058 A * | 8/1990 | ............ | E04B 1/6813 |
| GB | 2432617 A * | 5/2007 | ............ | E04B 1/6813 |
| IT | 1050031 B * | 3/1981 | ............ | D21J 7/00 |
| KR | 2024060247 A * | 5/2024 | ............ | E04B 1/6806 |
| WO | WO-9726420 A1 * | 7/1997 | ............ | E04B 1/6807 |
| WO | WO-9832930 A1 * | 7/1998 | ............ | E04B 1/6806 |
| WO | WO-9913174 A1 * | 3/1999 | ............ | E04B 1/6816 |
| WO | WO-9922083 A1 * | 5/1999 | ............ | E04B 1/6812 |
| WO | WO-0040815 A1 * | 7/2000 | ............ | E04B 1/6812 |
| WO | WO-2005106176 A1 * | 11/2005 | ............ | E06B 1/62 |
| WO | WO-2008074400 A1 * | 6/2008 | ............ | E04B 1/6812 |
| WO | 2012100840 A1 | 8/2012 | | |
| WO | WO-2012142267 A1 * | 10/2012 | ............ | B29C 44/182 |
| WO | 2015057650 A1 | 4/2015 | | |
| WO | WO-2019074789 A1 * | 4/2019 | | |
| WO | WO-2019211471 A1 * | 11/2019 | ............ | E04B 1/6806 |
| WO | WO-2020111813 A1 * | 6/2020 | ............ | E04B 1/6806 |
| WO | WO-2020123232 A1 * | 6/2020 | ............ | B29C 44/185 |
| WO | WO-2022043216 A1 * | 3/2022 | ............ | E04B 1/6812 |
| WO | WO-2023039745 A1 * | 3/2023 | ............ | E04B 1/6813 |
| WO | WO-2023205040 A1 * | 10/2023 | ............ | B29C 44/185 |
| WO | WO-2023205041 A1 * | 10/2023 | ............ | B29C 44/188 |
| WO | WO-2023205043 A1 * | 10/2023 | ............ | B29C 44/182 |
| WO | WO-2023205044 A1 * | 10/2023 | ............ | E04B 1/6812 |
| WO | WO-2023205191 A1 * | 10/2023 | ............ | B29C 44/185 |
| WO | WO-2023205192 A1 * | 10/2023 | ............ | B29C 44/188 |
| WO | WO-2023205194 A1 * | 10/2023 | ............ | B05C 17/002 |
| WO | WO-2023205195 A1 * | 10/2023 | ............ | B32B 1/08 |
| WO | WO-2024013748 A1 * | 1/2024 | ............ | A61B 17/0057 |

OTHER PUBLICATIONS

PCT International Search Report for Application No. PCT/US2023/019011; ISA/EPO; Jul. 4, 2023.
PCT International Search Report for Application No. PCT/US2023/018594; ISA/EPO; Jun. 28, 2023.
PCT International Search Report for Application No. PCT/US2023/019014; ISA/EPO; Jun. 30, 2023.
PCT International Search Report for Application No. PCT/US2023/018598; ISA/EPO; Jun. 26, 2023.
PCT International Search Report for Application No. PCT/US2023/019019; ISA/EPO; Jul. 5, 2023.
PCT International Search Report for Application No. PCT/US2023/018600; ISA/EPO; Jul. 17, 2023.
PCT International Search Report for Application No. PCT/US2023/019023; ISA/EPO; Jul. 17, 2023.

* cited by examiner

FOAM ENVELOPE FOR SEALING LARGE VOLUMES

BACKGROUND OF THE INVENTION

Field of the Invention

The present invention relates to a method of applying foam and foams that are used to fill cavities, cracks, and crevices to enhance the sealing and insulating properties of buildings and, more particularly, to a system including an enclosed envelope such as a tube that can be placed within a volume to be sealed and then supplied with a foamable component, or to a foamable system that is contained within an enclosed envelope such as a tube that can be placed within the volume to be sealed. Such a system which reduces the installation time as well as the amount of foam raw material waste is desired by the market.

Description of Related Art

U.S. Pat. No. 10,384,378 to O'Leary et al describes a system for sealing large volumes or gaps that includes a flexible envelope that can assume the shape of the volume when filled with a foaming composition and that expands the envelope to the boundaries of the volume. The foaming composition may be integral with the envelope or delivered in bulk by an external device. The foaming composition may be one or multiple parts, typically two parts such as a polyisocyanate and a polyol, in which case it is necessary to keep the two parts separate until foaming is desired. Separation may be accomplished by providing multiple compartments that deliver components via a mixing device into the interior. The envelope may include ribs for structural strength and shaping and leak pores around its perimeter to enhance bonding and sealing. It may also include perforations for bulk, modular seals or for separation of portions of the envelope to seal irregular shapes.

U.S. Pat. No. 8,882,483 to O'Leary et al describes a system for sealing or insulating a large volume. The system includes an envelope having walls defining an interior. The interior is configured to receive a foaming composition. The envelope is initially configured in a retracted configuration. A foaming composition is configured for insertion into the interior of the envelope. The envelope is configured such that the foaming composition expands the envelope such as to fill a large gap.

U.S. Pat. No. 9,561,606 to O'Leary et al discloses a system for sealing large volumes or gaps and includes a flexible envelope that can assume the shape of the volume when filled with a foaming composition that expands the envelope to the boundaries of the volume. The foaming composition may be integral with the envelope or delivered in bulk by an external device. The foaming composition may be one or multiple parts, typically two parts such as a polyisocyanate and a polyol, in which case it is necessary to keep the two parts separate until foaming is desired. Separation may be accomplished by providing multiple compartments that deliver components via a mixing device into the interior. The envelope may include ribs for structural strength and shaping, and leak pores around its perimeter to enhance bonding and sealing. It may also include perforations for bulk, modular seals or for separation of portions of the envelope to seal irregular shapes.

United States Patent Application Publication Nr. 20210198411 to Certain Teed LLC teaches methods, devices and systems for insulation, e.g., of cavities associated with walls, ceilings, floors and other building structures, with foam insulation. In one aspect, the disclosure provides a method for providing a cavity of a building with an expanded foam insulation. The method includes dispensing an amount of an expanding foam insulation into the cavity, the expanding foam insulation being dispensable and expandable to provide the expanded foam insulation material, the expanding foam insulation material formed from a premix comprising at least one polyol, at least one polyisocyanate, a blowing agent, and an encapsulated catalyst, the encapsulated catalyst comprising a plurality of catalyst capsules, each comprising an amount of catalyst and a capsule shell encapsulating the catalyst, wherein the dispensing is performed to apply a force to the encapsulated catalyst sufficient to break capsules and release catalyst, the released catalyst initiating reaction between the at least one polyol and the at least one isocyanate; and then allowing the dispensed amount of expanding foam insulation to substantially finish expanding after it is dispensed in the cavity, thereby forming the expanded foam insulation in the cavity.

PCT Publication Number WO 2020123232 to Davlin et al discloses a method and system for the application of foam insulation onto a surface or into a cavity includes a sheet with an aperture where the sheet covers or partially covers the surface or a cavity with the aperture adjacent to the surface or cavity. A pressure-activated foam generator which generates foam is coupled with the sheet. The pressure-activated foam generator includes a frangible output seal with a ruptured position. The pressure-activated foam generator is positioned so that in the ruptured position the foam has a path from the frangible output seal through the aperture and onto the surface or into the cavity. The sheet is connected to cover or partially cover the surface or cavity, and the pressure-activated foam generator is activated and the foam flows onto the surface or into the cavity.

What is needed is a system having an enclosed envelope such as including a tube that can be placed within the volume to be sealed, and on subsequent foam expansion, allows the foam to expand in a desired direction necessary to seal a gap. In some embodiments, the enclosed envelope is exteriorly supplied with foamable components, while in other embodiments, a foamable system is contained within an enclosed envelope. Such a system can reduce the installation time as well as the amount of foam raw material waste and is particularly beneficial for sealing small cavities such as between a window and a wall.

BRIEF SUMMARY OF THE INVENTION

This application pertains to an article comprising a tube having a length L, a width W and a height H wherein the tube comprises an upper section, a lower section, an inner section and an outer section, the tube comprises a tube wall having an inner layer and an outer layer, the inner layer being a semipermeable membrane that is permeable to vapors but impermeable to liquids and the outer layer being a nonwoven fabric, the tube has at least one inlet port integrated into the tube wall to permit the flow of fluid into the tube interior, the tube has a through-thickness Gurley air permeability of from 1 to 2,000 seconds, the tube has a tensile modulus in the L direction of from 300 to 450 MPa and from 200 to 320 MPa in the W direction, and the tube has a plurality of holes that penetrate through the inner and outer layers of the upper section and/or the lower section of the tube.

This invention also relates to a method for sealing an air gap between building interfaces, the method comprises the steps of:
  providing an article comprising a tube,
    wherein the tube has a length L, a width W and a height H, the tube comprises an upper section, a lower section, an inner section, and an outer section, and the tube comprises a tube wall having an inner layer and an outer layer,
    wherein the inner layer is a semipermeable membrane that is permeable to vapors but impermeable to liquids and the outer layer is a nonwoven fabric,
    wherein the tube has at least one inlet port integrated into the tube wall to permit the flow of fluid into the tube interior, and
    wherein the tube has a through-thickness Gurley air permeability of from 1 to 2,000 seconds, and a tensile modulus in the L direction of from 300 to 450 MPa and from 200 to 320 MPa in the W direction, and
    the tube has a plurality of holes that penetrate through the inner and outer layers of the upper section and/or the lower section of the tube;
  inserting the article into the air gap between the building interfaces;
  injecting an activated or activatable foamable composition into the tube via at least one inlet port, and
  either activating the foam or allowing the foam to expand, thus expanding the tube,
    wherein the expanding foam exits the tube through the tube holes in the upper section and/or the lower section of the tube and, when present, between spaced apart flow restrictors that extend along the length of the tube, the expanding foam filling the air gap between the building interfaces and of the building structure and then cure in situ into a foam structure.

DETAILED DESCRIPTION OF THE INVENTION

This invention relates to a system utilizing an article or envelope such as a tube that can be placed within a volume to be sealed, and that allows foam from that article to expand preferably in a desired direction to seal a gap in the volume. The words "article" and "envelope" are used interchangeably herein. In some embodiments, a foamable component is supplied to the article, while in other embodiments the article includes a foamable system contained within the enclosed envelope.

Article Utilizing a Supplied Foamable Component

Figure 1:
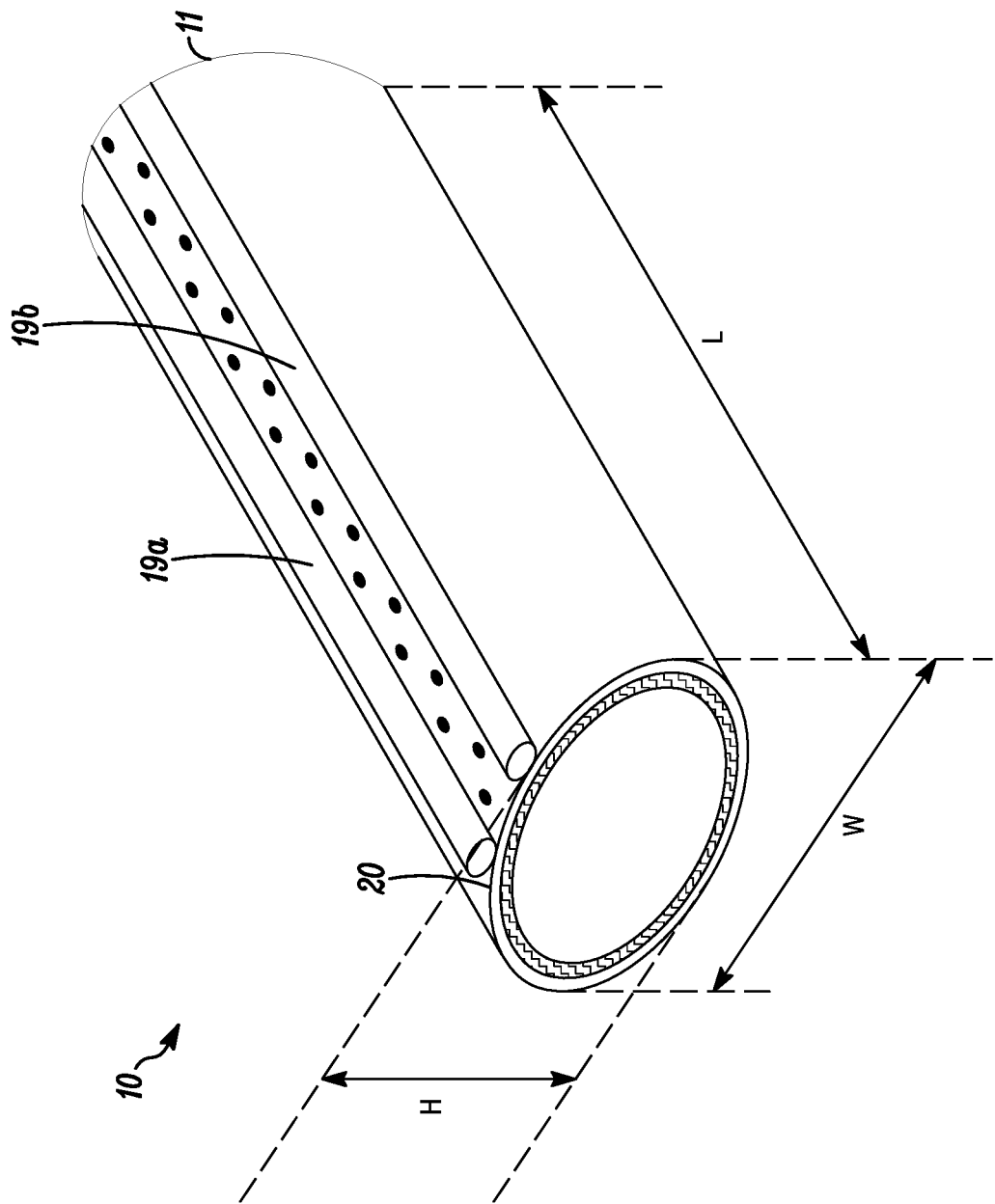
FIG. 1 is a perspective view of an article comprising a tube having a length L, a width W and a height H.

FIG. 1 illustrates one embodiment wherein a foamable component is supplied to the article, the article 10 comprises a tube 11 having a length L, a width W and a height H. The tube comprises peripheral areas, including an upper section 13, a lower section 14, an inner section 15 and an outer section 16. The tube also comprises a tube wall having an inner layer 17 and an outer layer 18, the inner layer 17 being a semipermeable membrane that is permeable to vapors but impermeable to liquids and the outer layer 18 being a nonwoven fabric; with the inside face of outer layer 18 attached to the outside face of inner layer 17 forming the tube wall. In this embodiment, the tube has at least one inlet port integrated into the tube wall to permit the flow of fluid into the tube interior. The tube has a through-thickness Gurley air permeability; that is, the combined permeability through the tube wall comprising both inner layer 17 and outer layer 18 of from 1 to 2,000 seconds. The tube wall material has a tensile modulus in the L direction of from 300 to 450 MPa and from 200 to 320 MPa in the W direction. The tube also has a plurality of holes that penetrate through the inner 17 and outer 18 layers of the upper section 13 and/or the lower section 14 of the tube along the length of the tube, generally parallel to the length of the tube.

In some embodiments, the width W and the height H of the tube are of the same dimensions i.e., the tube has a circular cross section. The width W and/or height H of the tube may vary for differing applications. In one example a circular unexpanded tube may have an outer diameter of from 50 to 100 mm. The length L of the tube, as a minimum, has to be sufficient to cover the length of gap in the cavity to be filled with foam.

Figure 2:
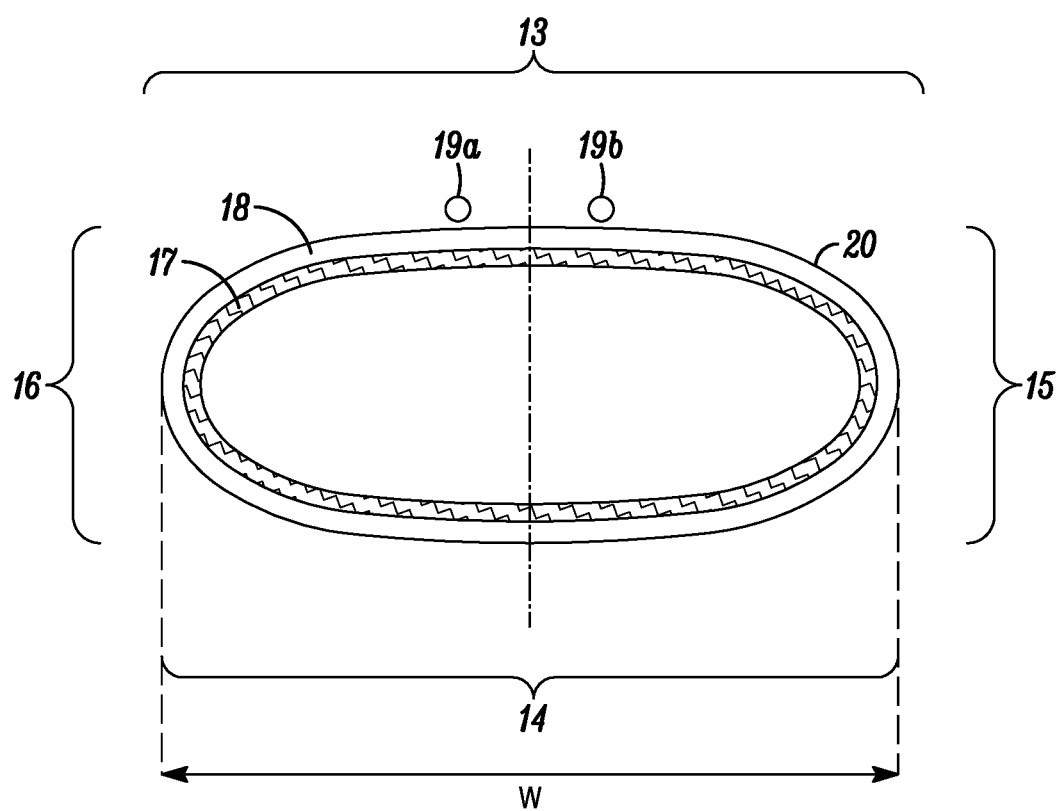
FIG. 2 is a cross-sectional view of an article comprising peripheral areas, including an upper section, a lower section, an inner section and an outer section.

In the foamable component supplied article shown in FIG. 2, the tube comprises peripheral areas, including an upper section 13, a lower section 14, an inner section 15, and an outer section 16. Inner section 15 faces into the building interior while outer section 16 faces externally. The tube comprises an inner layer 17 and an outer layer 18.

The inner layer 17 is a semipermeable membrane such as, preferably, a microporous film, a spunbonded-meltblown-spunbonded (SMS) sheet, or a spunbonded-meltblown-meltblown-spunbonded (SMMS) sheet. By "semipermeable membrane" it is meant the membrane is permeable to vapors but impermeable to liquids.

The outer layer 18 is a nonwoven fabric, preferably spunbonded sheet of continuous filaments, a SMS sheet, or a SMMS sheet. In many preferred embodiments, the nonwoven fabric of the outer layer comprises polypropylene or polyester fiber, as those surfaces generally adhere well to various building sealing materials such as joint compound, etc. Additionally, in some embodiments, it is desirable the nonwoven fabric of the outer layer to have a higher vapor permeability than the inner layer.

In some embodiments the outer layer 18 is permeable to liquids. Such outer layer permeability can assist in the attachment of other fluid or paste-like building materials such as joint compounds, mortar, crack filler and the like to the article. In some embodiments, the outer layer 18 is permeable to an actively foaming composition, while the inner layer 17 is not.

The terms "nonwoven", "nonwoven fabric", "nonwoven sheet", and "nonwoven layer", are used interchangeably herein and as used herein refer to a structure of individual strands (e.g., fibers, filaments, plexifilaments, or threads) that are positioned in a random manner to form a planar material without an identifiable pattern, as opposed to a knitted or woven fabric. The term "fiber" is used herein to include staple fibers as well as continuous filaments. Examples of nonwovens include meltblown sheets, spunbonded sheets, and combinations of meltblown and spunbonded webs or layers; flash spun sheets including plexifilaments; staple-based webs or sheets including carded and air-laid webs or sheets; spunlaced or hydrolaced webs or sheets; and composite sheets comprising more than one nonwoven sheet or web.

The term "spunbonded" as used herein means a sheet made from fibers that are melt-spun by extruding molten thermoplastic polymer material as fibers from a plurality of fine, usually circular, capillaries of a spinneret with the diameter of the extruded fibers then being rapidly reduced by drawing and then quenching the fibers. The term "meltblown" as used herein, means fibers that are melt-spun by melt blowing, which comprises extruding a melt-processable polymer through a plurality of capillaries as molten streams into a high velocity gas (e.g., air) stream to make fine fibers.

The term "spunbonded" can also include flash-spun sheets of plexifilaments also known as flash-spun plexifilamentary sheets. The term "plexifilamentary" as used herein, means a three-dimensional integral network of a multitude of thin, ribbon-like, film-fibril elements of random length with a mean film thickness of less than about 4 microns and a median fibril width of less than about 25 microns. By plexifilaments it is meant plexifilamentary structures having film-fibril elements generally coextensively aligned with the longitudinal axis of the structure and they intermittently unite and separate at irregular intervals in various places throughout the length, width and thickness of the structure to form a continuous three-dimensional network.

A SMS sheet is a three-layer structure comprising a spunbonded layer, a meltblown layer and a spunbonded layer. Although there are three component layers in an SMS sheet it is sold in the trade as a unitary sheet roll good and therefor for the purpose of this document is considered to be a single layer. Likewise, a SMMS sheet is a four-layer structure comprising a spunbonded layer, two meltblown layers and a spunbonded layer. Although there are four component layers in an SMMS sheet it is sold in the trade as a unitary sheet roll good and therefor, for the purpose of this document, is also considered to be a single layer. Based on bonding, basis weight, and other treatments, SMS and SMMS sheets can be made impermeable to liquids while retaining some degree of vapor permeability.

In a preferred embodiment, the inner layer 17 is a nonwoven sheet that is a flash spun polyethylene plexifilamentary sheet; an exemplary material being available under the trademark Tyvek® from DuPont de Nemours Inc., Wilmington, Delaware. In some embodiments, the plexifilaments comprise a polymer having a density of from 930 to 970 $kg/m^3$.

In a preferred embodiment, the outer layer 18 is a nonwoven fabric of spunbonded polypropylene continuous filaments, an exemplary material being available under the trademark Typar® from DuPont de Nemours, Inc, Wilmington, Delaware. In some embodiments, the polypropylene continuous filaments comprise polypropylene polymer having a density of from 240 to 430 $kg/m^3$.

In some embodiments, each of the inner and outer layers preferably has a basis weight of 35 to 150 gsm. In some embodiments, the total basis weight of the tube wall is preferably 50 to 300 gsm; most preferably 75 to 200 gsm.

The tube wall has a through-thickness direction Gurley air permeability of from 1 to 2000 seconds when measured according to EN ISO5636-5:2013. This range is sufficient to allow gas to escape from the tube through the tube wall during the foam expansion process.

The tube is preferably sufficiently flexible to expand during the foaming process but preferably not to an extent where the tube bursts. In some embodiments, the tube wall, comprising the combined inner and outer layer, preferably has a tensile modulus in the L direction of from 300 to 450 MPa and from 200 to 320 MPa in the W direction according to EN ISO 527-1:2019. In some embodiments, the tube wall has a tensile modulus in the L direction of from 340 to 440 MPa and from 205 to 305 MPa in the W direction. Preferably, the tube wall, comprising the combined inner and outer layer, preferably has a tensile modulus of 200 MPa or greater in both the W and L directions, according to EN ISO 527-1:2019. The tube wall, comprising the combined inner and outer layer, can have a tensile modulus as high as of 450 MPa or greater in both the W and L directions, according to EN ISO 527-1:2019.

Likewise, the tube wall, comprising the combined inner and outer layer, preferably has a tensile strength at break greater than 10 MPa in in both the W and L directions, according to EN ISO 527-1:2019. In preferred embodiments, the tube wall, comprising the combined inner and outer layer, has a tensile strength at break greater than 13 MPa in both the W and L directions according to EN ISO 527-1:2019. The tube wall, comprising the combined inner and outer layer, can have a tensile strength at break as high as 25 MPa or higher in both the W and L directions. In some embodiments, the tube wall, when tested to standard EN 12311-1:2000, exhibits a maximum tensile force of at least 100N/50 mm, and in some embodiments exhibits a maximum tensile force of preferably at least 350N/50 mm.

In some embodiments, the peripheral areas of the tube (the upper section 13, the lower section 14, the inner section 15, and the outer section 16) have the same dimension and form a circular cross section. In some preferred embodiments, the upper and lower section 13 and 14 are of the same first dimension and the inner and outer sections 15 and 16 are of the same second dimension, but the second dimension is less than the first dimension of the upper and lower sections 13 and 14. Preferably the ratio of the width of the tube W to the height of the tube H is from 20:1 to 2.3:1.

Figure 8:
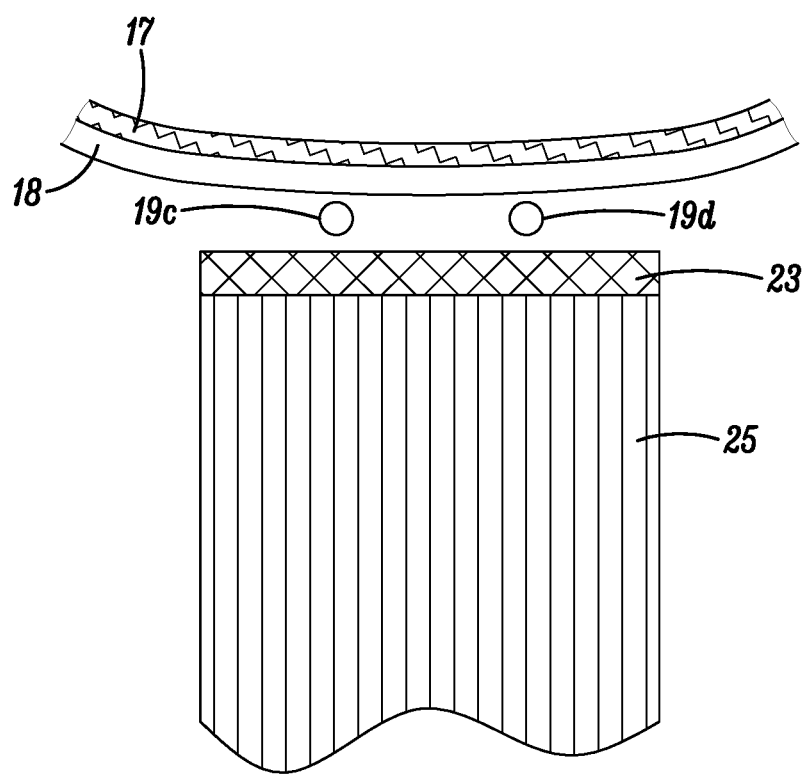
FIG. 8 is a cross-sectional view of another embodiment of an article inserted into an air gap space between building interfaces.

In some embodiments, the upper section 13 of the tube has two spaced-apart flow restrictors 19a and 19b extending along the length of the tube that are attached to the outer surface 20 of the outer layer 18 of the tube. These flow restrictors are shown in both FIGS. 1 and 2. Alternatively, in other embodiments, the lower section 14 of the tube has two spaced-apart flow restrictors 19c and 19d extending along the length of the tube that are attached to the outer surface 20 of the outer layer 18 of the tube. These flow restrictors 19c and 19d are shown in FIG. 8. In another embodiment, the tube has two spaced-apart flow restrictors 19a and 19b the upper section 13 and two spaced-apart flow restrictors 19c and 19d in the lower section 14 of the tube, these four flow restrictors all extending along the length of the tube and are attached to the outer surface 20 of the outer layer 18 of the tube.

The flow restrictors are preferably linear structures attached lengthwise to the outer layer of the tube that create a channel on the surface of the tube having parallel walls extending radially from the outer layer of the tube. The flow restrictors limit the initial area of foam contact between wall and tube, to direct an actively foaming material on the outside of the tube, by preferentially channeling the actively foaming materials radially from the tube and towards the wall or surface to be sealed, while retarding sideways movement of the actively foaming material. Suitable flow restrictors include such things as adhesively-applied gasket tapes and nail sealing tapes that are linear strips of foam provided with a strip of adhesive. Other materials could be used as flow restrictors and attached to the outer surface with adhesives, etc., or as desired, as long as each flow restrictor creates a wall extending a desired linear distance radially from the outer surface of the tube. In many embodiments, each flow restrictor creates a wall extending about 0.5 mm or greater from the outer surface of the tube. In some embodiments, each flow restrictor creates a wall extending about 0.5 mm to about 2 mm from the outer surface of the tube.

In some embodiments, the two spaced-apart flow restrictors extending along the length of the tube, forming a channel on the surface of the tube, are spaced apart about 10 mm or greater on the outer surface of the tube. In some embodiments, the two spaced-apart flow restrictors are spaced apart about 10 mm to about 60 mm on the outer surface of the tube. In some embodiments, the two spaced-apart flow restrictors are spaced apart about 20 mm to about 40 mm on the outer surface of the tube.

The tube has a plurality of holes that penetrate and extend through the tube wall comprising both the inner 17 and outer 18 layers of the tube. The holes can be present in either the upper section 13 of the tube, the lower section 14 of the tube, or in both the upper section 13 and the lower section 14 of the tube. The holes, if present in a section, are preferably located in a lengthwise strip of area that is 10 mm to about 60 mm on the outer surface of the tube. The holes, if present in a section, are preferably located between a set of flow restrictors in that section if a set of flow restrictors is located in that section. In other words, if flow restrictors are present, the holes are made in, and are restricted to, the tube area between the flow restrictors. For example, as shown in the figures, holes are shown in the upper section 13, between the two spaced-apart flow restrictors 19a and 19b and/or in the lower section 14 of the tube between the two spaced-apart flow restrictors 19c and 19d. Therefore, holes can be made in, and are restricted to, the area in both upper section 13 and the lower section 14 of the tube that is between their associated flow restrictors. One specific embodiment of the location of the holes is further idealistically shown in FIG. 1 as black dots between spaced-apart flow restrictors 19a and 19b. The holes can be circular, square, rectangular, hexagonal or some other shape and can be arranged in a random, linear or some other arrangement. A preferred pattern is two rows of holes, with the centerline of the holes oriented in parallel lines along the length of the tube spaced about 4 to 10 mm apart, or 8 to 10 mm apart. Typically, each hole can have an open area of from about 2 to 10 $mm^2$ and the separation between the centers of each hole can be from about 4 to 30 mm. In some embodiments, the holes are round and in some embodiments the holes are round with a diameter of about 0.8 to 5 mm, preferably 2 to 3 mm.

When a material is actively foaming inside the tube, the tube expands and the holes serve as passageways for the actively foaming material to exit through the tube wall, directing that actively foaming material radially upward, or radially downward, or both radially upward and downward, depending on whether the holes are in the upper section 13, the lower section 14, or both the upper section 13 and lower section 14 of the tube. This directionally ensures the foam resides in the desired area/volume outside the tube and that the gap to be sealed between the article and one or more surfaces will be adequately sealed, as the foaming material will be directed initially preferentially to the surface(s) above and/or below the article.

In one embodiment, the tube walls at the two ends of the tube are sealed together, preferably by contacting the inner surfaces of the tube wall together and then sealing the two tube walls together by use of either ultrasonic sealing or an applied adhesive. In this embodiment, preferably, there is no route for any foam to exit the tube from the ends of the tube.

In another embodiment, the tube is endless; that is, two ends of the tube are joined together by inserting one end into another end and then attaching the two ends, for example, by tape or other methods. The two ends can be joined together similar to the depictions of an ouroboros (or uroboros), which is an ancient symbol depicting a serpent or dragon eating its own tail; but the endless tube is not limited to a circular structure. For example, tubes can be installed around the four straight sides of a window, and the ends joined by inserting the end of one tube inside another tube, followed by sealing the two ends together. This provides a continuous inner tube for the foam to expand, and a continuous seal around the window by the foam exiting from the endless tube. Likewise, a plurality of tubes may be sealed using a combination of end techniques, wherein some tubes having one end wherein the tube walls are sealed together, while the other end of the tube is inserted in an adjacent tube, following by attaching the two tubes together. For example, if only two tubes are to be combined, each tube will have one end having tube walls sealed together while the other ends are meshed together by inserting one end of one tube inside the end of the other tube and attaching the two tubes together.

Figure 3:
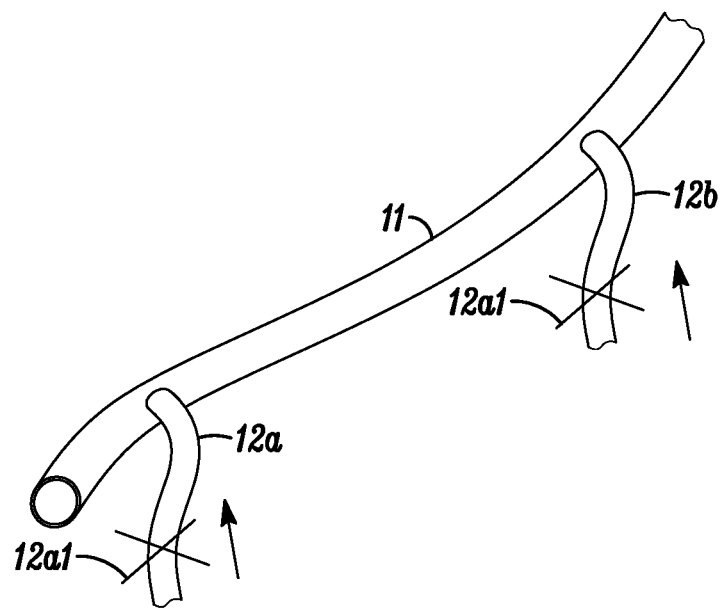
FIG. 3 is a perspective view of an article comprising a plurality of inlet ports for injecting foamable material into the article, with each inlet port having a valve for closing each port.

In this embodiment, wherein a foamable component is supplied to the article, preferably the tube has at least one inlet port integrated into the tube wall to permit the flow of fluid into the tube interior. Preferably that fluid is an actively foaming component (also referred to herein as an activated foamable composition) or a composition or collection of ingredients that will foam (also referred to herein as an activatable foamable composition). More preferably the tube has a plurality of inlet ports integrated into the tube wall; an idealized example representation of inlet ports 12*a* and 12*b* as shown in FIG. 3. To facilitate uniform filling of the tube, it is believed the spacing between adjacent inlet ports can preferably be between 200 mm to 500 mm. The tube or tube wall may optionally further comprise an outlet port, not shown in the figures, which may be used when there is a need to release pressure within the tube.

Figure 4:
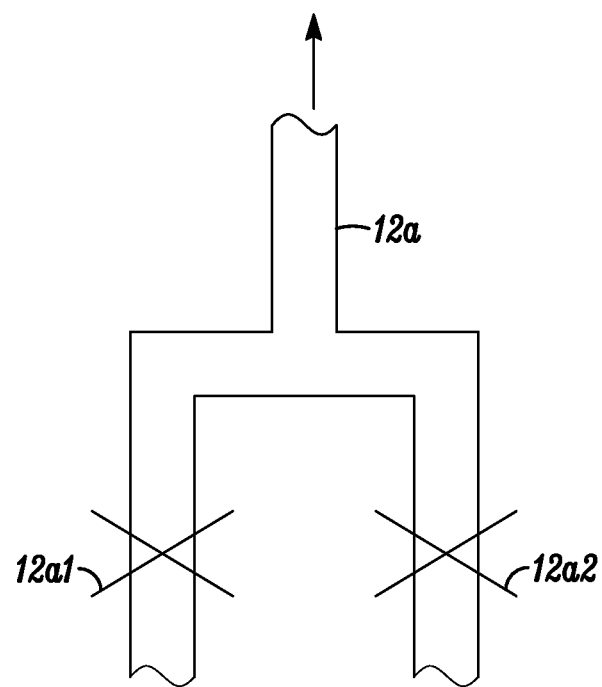
FIG. 4 illustrates an embodiment wherein the inlet port has a plurality of valves suitable for initiating the mixing of foamable components as they are injected into the article.
Figure 5:
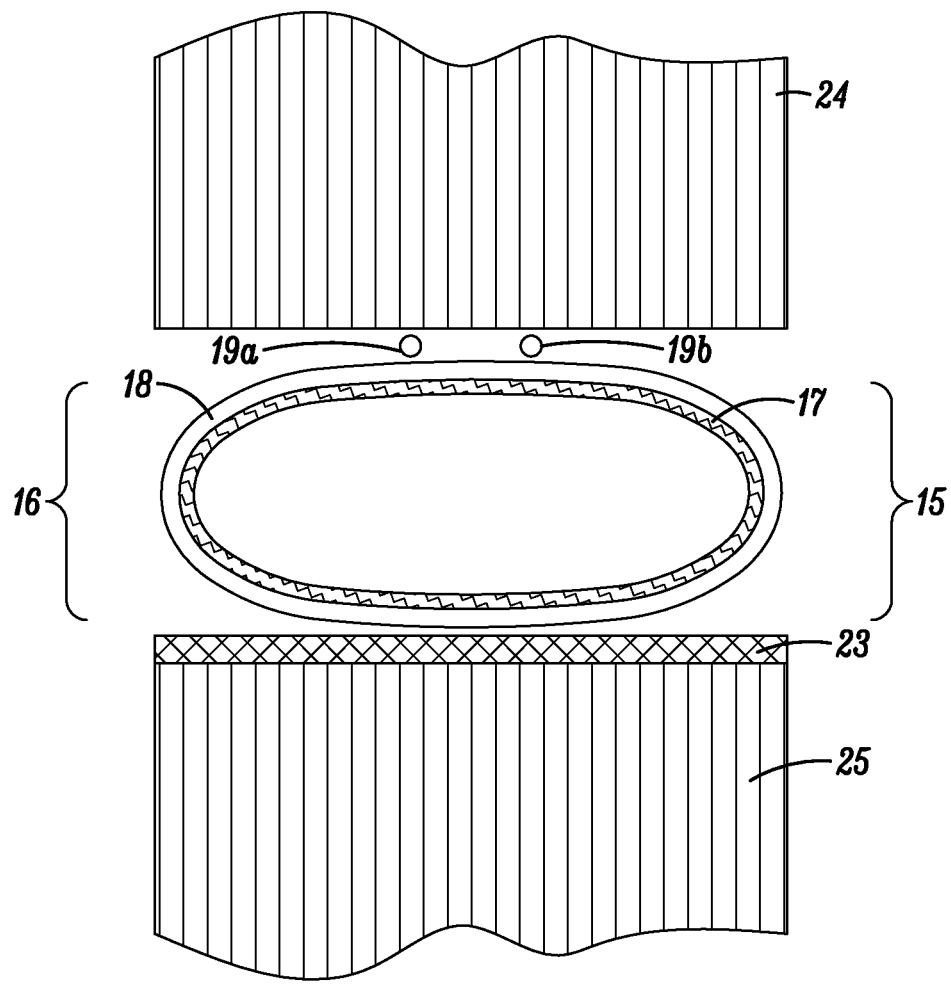
FIG. 5 is a cross-sectional view of an article inserted into an air gap space between building interfaces.

As shown in FIG. 3, inlet ports 12*a* and 12*b* have a single valve 12*a*1, preferably an "on/off" valve, close to the integration point with the tube 11. As depicted in FIG. 4, the inlet ports 12*a* and/or 12*b* may comprise two valves 12*a*1 and 12*a*2, again preferably "on/off" valves. This valve arrangement may be desirable for injecting certain components of a foamable composition.

Preferably, the inlet ports have one-way valve that will allow foamable material to enter but not exit the tube through the inlet port. For example, a nozzle tip or tip of a dispenser can inject the foamable material into the tube via the inlet port, and then remove the nozzle, etc., and wait for the foamable material to foam and expand and fill the tube. With multiple inlet ports, if unfilled areas are still present, those can be filled using the nearest inlet port without being blocked by foam on the inside of the tube.

The inlet port can be present in many different embodiments, including as a tube-shaped port as shown, or a one-way port located on or near the surface of the tube, flush with the outer surface of the tube, or even located inside the tube. For example, a valve known as a single-part pinch valve could be used.

Figure 7:
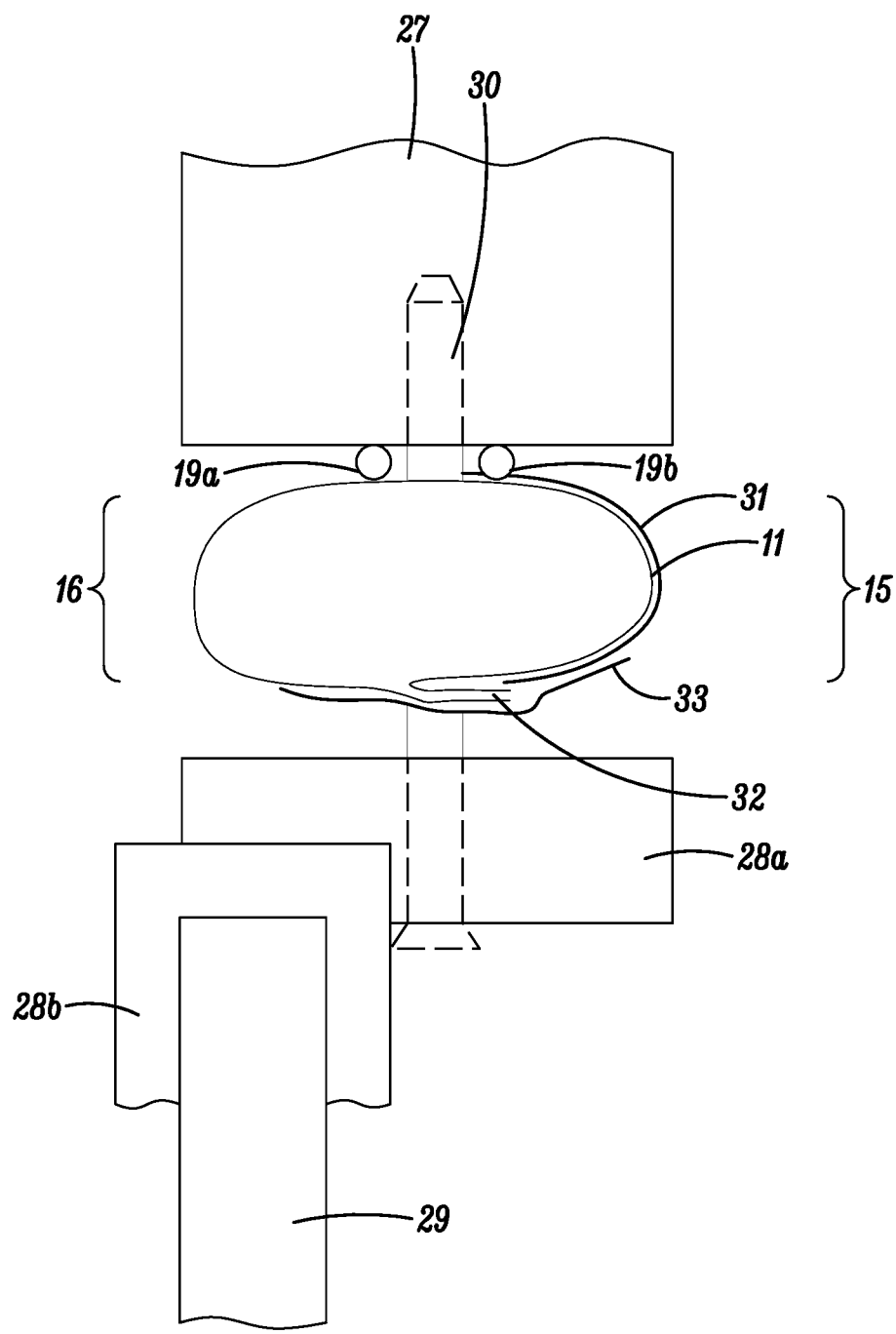
FIG. 7 is a cross-sectional view of a window to building wall interface with a tube inserted into the air gap between the window and the building wall.

FIG. 7 shows a typical installation of the article where part of a building wall is shown as 27, parts of the window frames are shown as 28*a* and 28*b* with a windowpane being 29. Tube 11 is inserted between the wall 27 and window frame 28*a*. A fastener 30 such as nails or screws connects window frame 28*a* with wall 27 and holds the window assembly in place. The fastener 30 passes through tube 11 and further preferably pass between the two flow restrictors 19*a* and 19*b* and/or the two flow restrictors 19*c* and 19*d*.

Preferably, as shown at 32 in FIG. 7, the two circumferential edges of tube 11 are suitable sealed, such as by adhesive bonding or ultrasonic welding. Also shown in FIG. 7 is a vapor control layer or liquid sealant 31 that covers the inner section 15 on the outer surface of the tube 11 and partially extends onto the upper 13 and lower 14 sections of the tube 11. Alternatively, the vapor control layer or liquid sealant can be employed on the inner surface of the tube in the inner section 15. The vapor control layer or liquid sealant serves the function of a vapor barrier, directing any moisture that accumulates around the tube preferentially to the outside of the wall versus the inside of the wall; and also helps prevent moisture from entering the tube from the inside of the wall. This vapor control layer may be made from polyethylene, ethylene vinyl alcohol copolymer (EVOH) or polyvinyl alcohol (PVOH) or a metallic foil such as aluminum.

Foamable Composition

Figure 6:
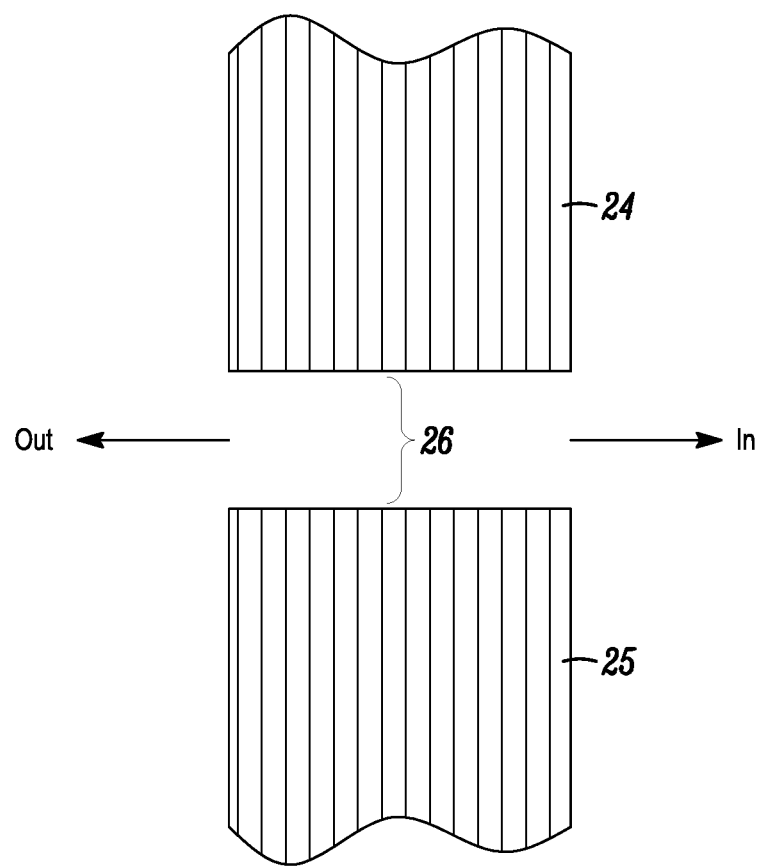
FIG. 6 is a cross-sectional view of a building interface.

By foamable composition is meant a composition that when all the ingredients are combined to initiate a chemical reaction, the composition starts foaming and expands in volume. In the applications discussed here, the activation of the foaming process is initiated prior to or during the injection of the foamable composition into the tube 11. As the actively foaming material expands within tube 11, the actively foaming material exits the tube through the tube holes in the upper section 13 and/or lower section 14 of the tube, and preferably if present, between the two spaced apart flow restrictors 19*a* and 19*b* and/or 19*c* and 19*d* that extend along the length of the tube so as to fill, as shown in FIG. 6, the air gap 26 between the building interfaces 24 and 25 of the building structure and then cure in situ, thus preferably providing an air tight and water impermeable seal in the gap between the interfaces.

In one embodiment, the foamable composition comprises a first foamable composition component such as an isocyanate and a second foamable composition component such as a polyol. The isocyanate component may be formulated to have a monomeric diisocyanate content of less than 1 weight percent or even less than 0.1 weight percent. The polyol component may further comprise a catalyst and/or a blowing agent.

The foamable composition may be presented to the inlet valve by several methods. For some formulations, all the materials may be mixed together in a single container and pumped to the inlet valve. For some other compositions, it may be desirable to keep some of the components separate until injection. For example, first foamable composition components can be injected via port 12*a*1 in FIG. 4 and second foamable composition component may be injected via port 12*a*2.

The foamable composition may also be supplied in a container like a packet or an aerosol can. In some embodiments all the foamable composition components are filled into a single container or aerosol can with blowing agents added. Suitable blowing agents can be selected from a group consisting of alkanes such as heptane, hexane, n-pentane, iso-pentane, n-butane, iso-butane, propane, cyclohexane, and cyclopentane; ethers such as furan, dimethyl ether, diethyl ether, methylal, and heptafluorodimethyl ether; ketones such as acetone and methyl ethyl ketone; alkyl carbozylates such as methyl formate, dimethyl oxalate and ethyl acetate; and halogenated alkanes such as methylene chloride, difluoromonochloromethane, difluoromethane, 1,1,1,2-tetrafluoroethane, difluoroethanes, 1-chloro-2,2,2,-trifluoroethane, 2,2-dichloro-2-fluoroethane, ethylchloride, dichloroethane, pentafluoropropane, heptafluoropropane; hydrohaloolefin, and trans-1,3,3,3-tetrafluoropropene; as well as carbon dioxide, and nitrogen.

In another embodiment the first and second foamable components are filled into two separate containers or aerosol cans or tanks together with suitable blowing agents. Before injection through the inlet ports of the tube, both components can be run through a mixing nozzle or other device where the foamable components are mixed, initiating the foaming reaction.

Yet another method of providing a foamable material from the exterior of the tube is to contain it in packet. For example, a packet made from thermoplastic films comprising two compartments separated by a frangible barrier, one compartment comprising polyol and the other compartment comprising isocyanate, could be used to supply a foamable material to the tube. The packet could be attached to the inlet ports of the tube so that the contents are in fluid communication with the inside of the tube, and then the frangible barrier can be broken by hand thus allowing the component materials to mix and initiate the foaming reaction, which would forward the actively foaming composition into the tube via the tube inlet ports, and then to the desired area exterior to the tube through the holes in the tube.

Irrespective of the delivery method, activation of the foamable material is initiated either prior, during, or after the transfer of the foamable material into the tube, where the foamable material further actively foams and expands.

In some embodiments, the foamable composition can also comprise particles having a major dimension no greater than 1 mm to act as nuclei for cell formation thus yielding smaller pore sizes in the expanded foam. Exemplary particles are graphite, micro-balloons and calcite. For a polyurethane foam composition, these additional particles are incorporated into the second foamable composition component (polyol). Non-polyurethane two part chemistries are also suitable as foaming compositions, for example one based on an epoxy system or one based on a silicon system. In this instance the nucleating particles are kept separate from both major components until the time for mixing. Other particles may function to aid mixing of the reagents. For example, ferromagnetic or magnetic particles can enhance mixing when an external magnetic source is applied. This source may be a magnetic field or a magnetic rod. Other particles may be responsive to an external ultrasound source and in turn enhance mixing.

Other functionality enabling additives are flame retardants, pigments and fillers such as fibers, filaments, fibrils and pulps such as those of glass or aramid. In some embodiments, the addition of p-aramid pulp present in an amount of from 0.05 to 3.0 weight percent of the foamed composition has been shown to be beneficial. This type of pulp comprises highly fibrillated chopped p-aramid fibers preferably having a length no greater than 1,000 micrometers. Preferably the fibrillated fiber diameter is about 50 micrometers. The pulp may be added to either the first foamable composition component, the isocyanate, or the second foamable composition component, the polyol. Foamed polyurethane compositions incorporating p-aramid pulp exhibits increased compressive strength and compressive modulus with similar expansion and acceptable flexibility when compared with foamable compositions in which the pulp additive is absent. This increased compression or modulus enhances shock absorption properties in sealed gaps in fenestrations, a desirable feature in buildings where, for example, window expansion occurs in hot weather.

In some embodiments, the expanded foam is that it should be sufficiently flexible to compress to at least 10%, more preferably to at least 20% or even to at least 50% when tested according to standard EN 826:2013.

In some embodiments, the expanded foam shrinks no more than 20%, and preferably no more than 10% of the original expanded foam dimensions one week after expansion, when tested based on methods disclosed in standard EN 1604:2013. This evaluation is carried out at ambient temperature as well as in temperature cycles from −10 to +50° C.

In some embodiments, the expanded foam recovers at least 80% of its thickness from compression to at least 50% of its initial thickness, as determined by ISO 1856:2020 "Polymeric Materials, Cellular Flexible-Determination of Compression Set". This ensures the foam provides a flexible seal that can allow for expansion and contraction of foam sealing at the interface between building elements, thereby accommodating differences in thermal expansion coefficients and other features of the building elements.

The invention(s) described herein finds utility in new construction or in refurbishment of existing buildings where there is a gap to be filled. Typical applications include sealing of potential air gaps between a window and wall, between a door and wall, between a wall and roof, between two walls, and gap sealing between two adjacent prefabricated building panels or modules. These are sometimes referred to as building interfaces.

Method of Sealing an Airgap Between Building Interfaces

In one embodiment, a method for sealing an air gap 26 between building interfaces 24 and 25 using article utilizing a supplied foamable component comprises the steps of:
  providing an article 10 comprising a tube 11 wherein the tube 11 has a length L, a width W and a height H; the tube comprising an upper section 13, a lower section 14, an inner section 15, and an outer section 16; the tube also comprising a tube wall having an inner layer 17 and an outer layer 18, the inner layer 17 being a semipermeable membrane that is permeable to vapors but impermeable to liquids and the outer layer 18 being a nonwoven fabric; the tube also having at least one inlet port integrated into the tube wall to permit the flow of fluid into the tube interior and optionally an outlet port integrated into the tube wall to permit the flow of fluid out of the tube interior; wherein the tube has a through-thickness direction Gurley air permeability of from 1 to 2,000 seconds, the tube having a tensile modulus in the L direction of from 300 to 450 MPa and from 200 to 320 MPa in the W direction, and the tube having a plurality of holes that penetrate through the inner layer 17 and outer layer 18 of the upper section 13 and/or lower section 14 of the tube,
  inserting the article 10 into the air gap 26 between the building interfaces 24 and 25,
  injecting an activated or activatable foamable composition into the tube 11 via at least one inlet port, and either activating the foam or allowing the foam to expand, thus expanding the tube 11 and wherein the expanding foam exits the tube through the tube holes located in the upper section 13 and/or lowers section 14 of the tube and, when present, between two spaced apart flow restrictors 19*a* and 19*b* in the upper section 13 of the tube and/or two spaced apart flow restrictors 19*c* and 19*d* in the lower section 14 of the tube, the flow restrictors extending along the length of the tube, the expanding foam preferably filling the air gap 26 between the building interfaces 24 and 25 of the building structure and then curing in situ into a foam structure that preferably provides an air tight and water impermeable seal.

The method can further include the optional step of applying a binder to either the lower section 14 of the tube 11 or the upper surface 24 of the building interface prior to inserting the tube 11 into the air gap 26. This binder can be, for example, a double-sided tape or a hot melt adhesive to hold the tube in a desired position.

Article Comprising a Foamable Component

In some embodiments, the article includes a foamable system contained within the enclosed envelope. While the features of this embodiment of the article are discussed below, various details and options concerning features and elements that are in common with the previously described article utilizing a supplied foamable component are considered to also be applicable to this embodiment and are not repeated here to avoid additional redundancy.

Figure 9:
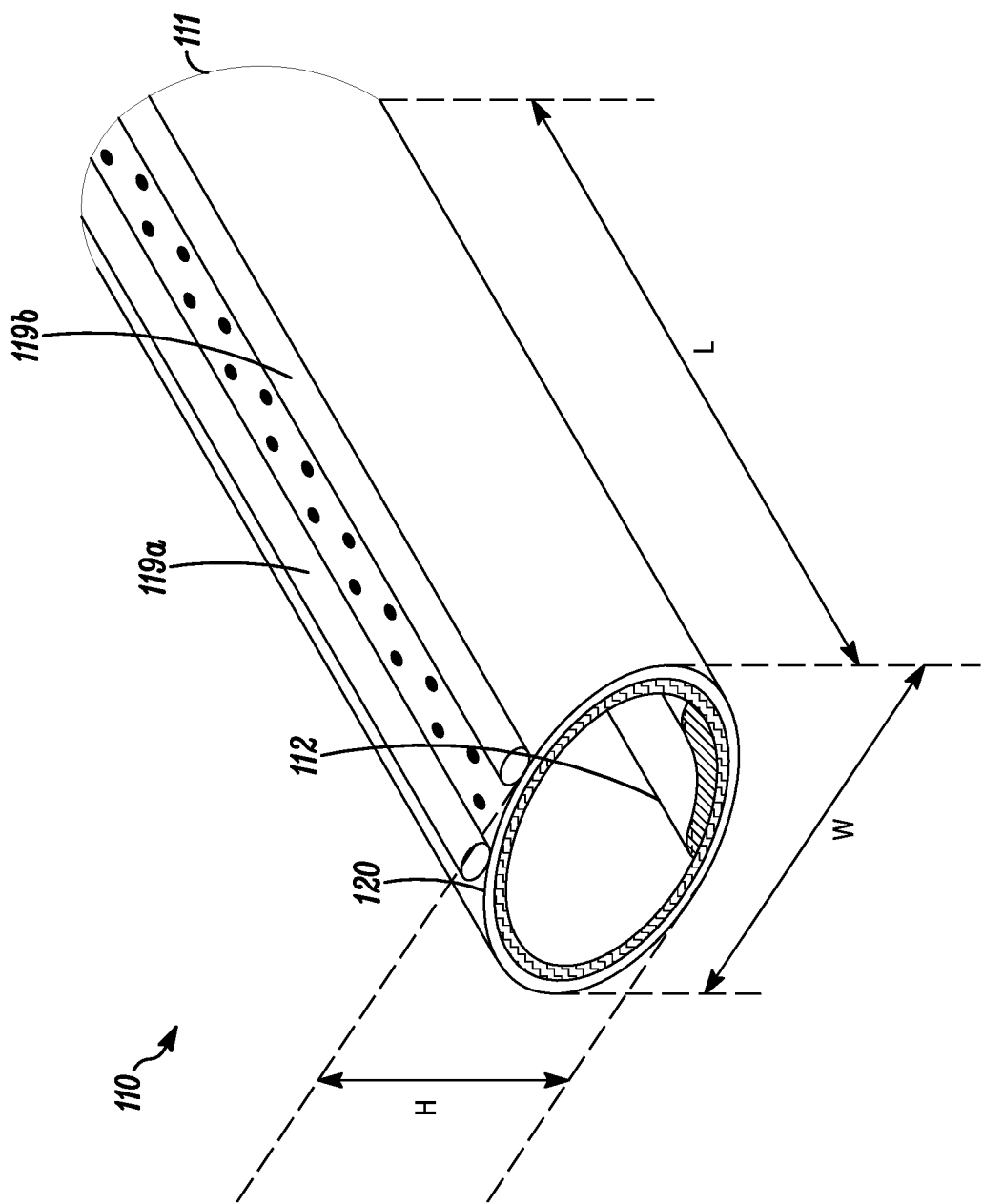
FIG. 9 is a perspective view of an article comprising a tube with an interior pouch, the tube having a length L, a width W and a height H.

FIG. 9 shows generally at 110 an article comprising a tube 111 having a length L, a width W and a height H and at least one pouch 112 inserted within the tube. In some embodiments, the width W and the height H of the tube are of the same dimensions i.e., the tube has a circular cross section. The width W and/or height H of the tube may vary for differing applications. In one example a circular unexpanded tube may have an outer diameter of from 50 to 100 mm. The length L of the tube, as a minimum, has to be sufficient to cover the length of gap in the cavity to be filled with foam.

Figure 10:
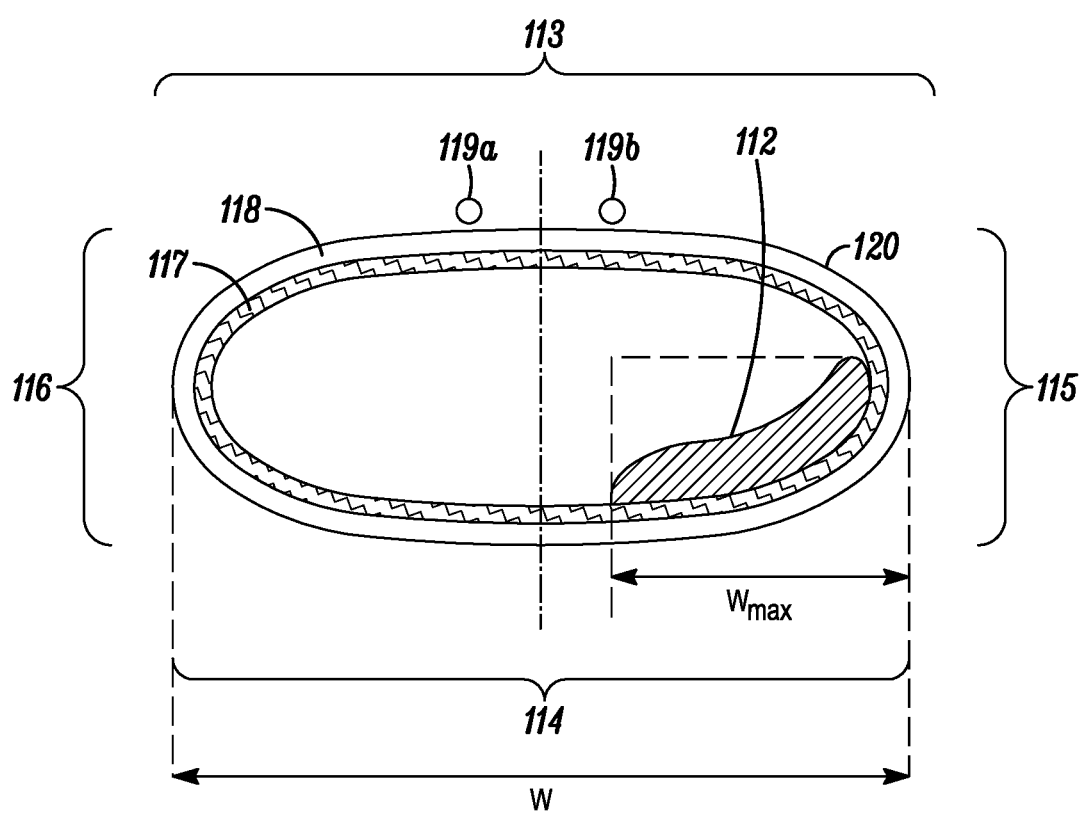
FIG. 10 is a cross-sectional view of an article comprising peripheral areas, including an upper section, a lower section, an inner section and an outer section.

The article comprising a foamable component, as shown in FIG. 10, has a tube 111 comprising an upper section 113, a lower section 114, an inner section 115 and an outer section 116. Inner section 115 faces into the building interior while outer section 116 faces externally. The tube comprises a tube wall having an inner layer 117 and an outer layer 118, the inner layer 117 being a semipermeable membrane such as a microporous film, an SMS sheet or an SMMS sheet, the membrane being permeable to vapors but impermeable to liquids. The outer layer 118 is a nonwoven fabric preferably of spunbonded polypropylene or polyester fiber. An SMS sheet is a three layer structure comprising a spunbonded layer, a meltblown layer and a spunbonded layer. Although there are three component layers in an SMS sheet it is sold in the trade as a unitary roll good and therefor for the purpose of this document is considered to be a single layer. An SMMS sheet is a four layer structure comprising a spunbonded layer, two meltblown layers and a spunbonded layer. Although there are four component layers in an SMMS sheet it is sold in the trade as a unitary roll good and therefor, for the purpose of this document, is also considered to be a single layer.

The tube has a through-thickness direction Gurley air permeability of from 1 to 2000 seconds when measured according to EN ISO5636-5:2013. This range is sufficient to allow gas escape during the foam expansion process.

The tube must be sufficiently flexible to expand during the foaming process but not to an extent where the tube bursts. Tubes having a tensile modulus in the L direction of from 300 to 450 MPa and from 200 to 320 MPa in the W direction according to EN ISO 527-1:2019 meet this requirement. In some embodiments, the tube has a tensile modulus in the L direction of from 340 to 440 MPa and from 205 to 305 MPa in the W direction. The tube wall properties as previously discussed herein also apply here but not repeated to avoid redundancy.

Except when the tube has a circular cross section, the upper and lower section 113 and 114 are of the same dimension and the inner and outer sections 115 and 116 are also of the same dimension but of a dimension less than that of the upper and lower sections 113 and 114. Preferably the ratio of the width of the tube W to the height of the tube H is from 20:1 to 2.3:1.

In some embodiments, the tube has, in the upper section 113 of the tube, two spaced apart flow restrictors 119a and 119b extending along the length of the tube that are attached to the outer surface 120 of the outer layer 118 of the tube. These flow restrictors are shown in both FIGS. 9 and 10. Features of flow restrictors already mentioned herein can apply to these flow restrictors In other embodiments, the tube has in the lower section 114 of the tube two spaced apart flow restrictors 119c and 119d extending along the length of the tube that are attached to the outer surface 120 of the outer layer 118 of the tube. These flow restrictors 119c and 119d are shown in FIG. 8.

In yet another embodiment, the tube has two spaced apart flow restrictors 119a and 119b the upper section and two spaced apart flow restrictors 119c and 119d in the lower section 114 of the tube, these four flow restrictors extending along the length of the tube and are attached to the outer surface 120 of the outer layer 118 of the tube.

The tube has a plurality of holes, shown as black dots in FIG. 9, that penetrate through the inner 117 and outer 118 layers of the tube in the upper section 113 and/or the lower section 114 of the tube and, when the two spaced apart flow restrictors 119a and 119b are present in the upper section 113 of the tube and/or when the two spaced apart flow restrictors 119c and 119d are present in the lower section 114 of the tube, the holes are restricted to that part of the tube that is between the two spaced apart flow restrictors 119a and 119b and/or the two spaced apart flow restrictors 119c and 119d. The holes may be circular, square, rectangular, hexagonal or some other shape and are arranged in a random, linear or some other arrangement. A preferred pattern is two rows of lines about 10 mm apart. Typically, the holes have an area of from about 2 to 10 mm$^2$ and the separation between holes is from about 4 to 30 mm.

In a preferred embodiment, the inner layer 117 of the tube 111 is a nonwoven sheet of flash spun polyethylene fiber, an exemplary material being available under the trademark Tyvek® from DuPont de Nemours Inc., Wilmington, DE. In some embodiments, the polymer of the fiber has a density of from 930 to 970 kg/m$^3$.

In another preferred embodiment, the outer layer 118 is a nonwoven fabric of spunbonded polypropylene fiber, an exemplary material being available under the trademark Typar® also from DuPont. In some embodiments, the polymer of the fiber has a density of from 240 to 430 kg/m$^3$. The various materials and layers previously described regarding the article utilizing a supplied foamable component equally apply here.

Figure 11:
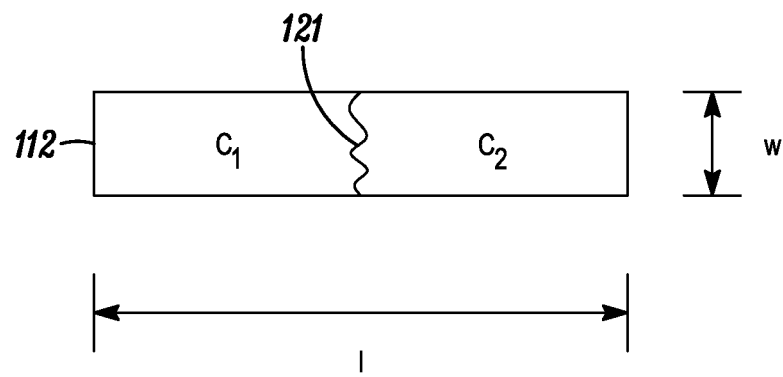
FIGS. 11 & 12 illustrate an idealized embodiment of a pouch comprising first $C_1$ and second $C_2$ compartments, the compartments being separated by one or more frangible barrier, and optionally including a static mixer; wherein the first compartment $C_1$ contains a first foamable composition component and the second compartment $C_2$ contains a second foamable composition component.
Figure 14:
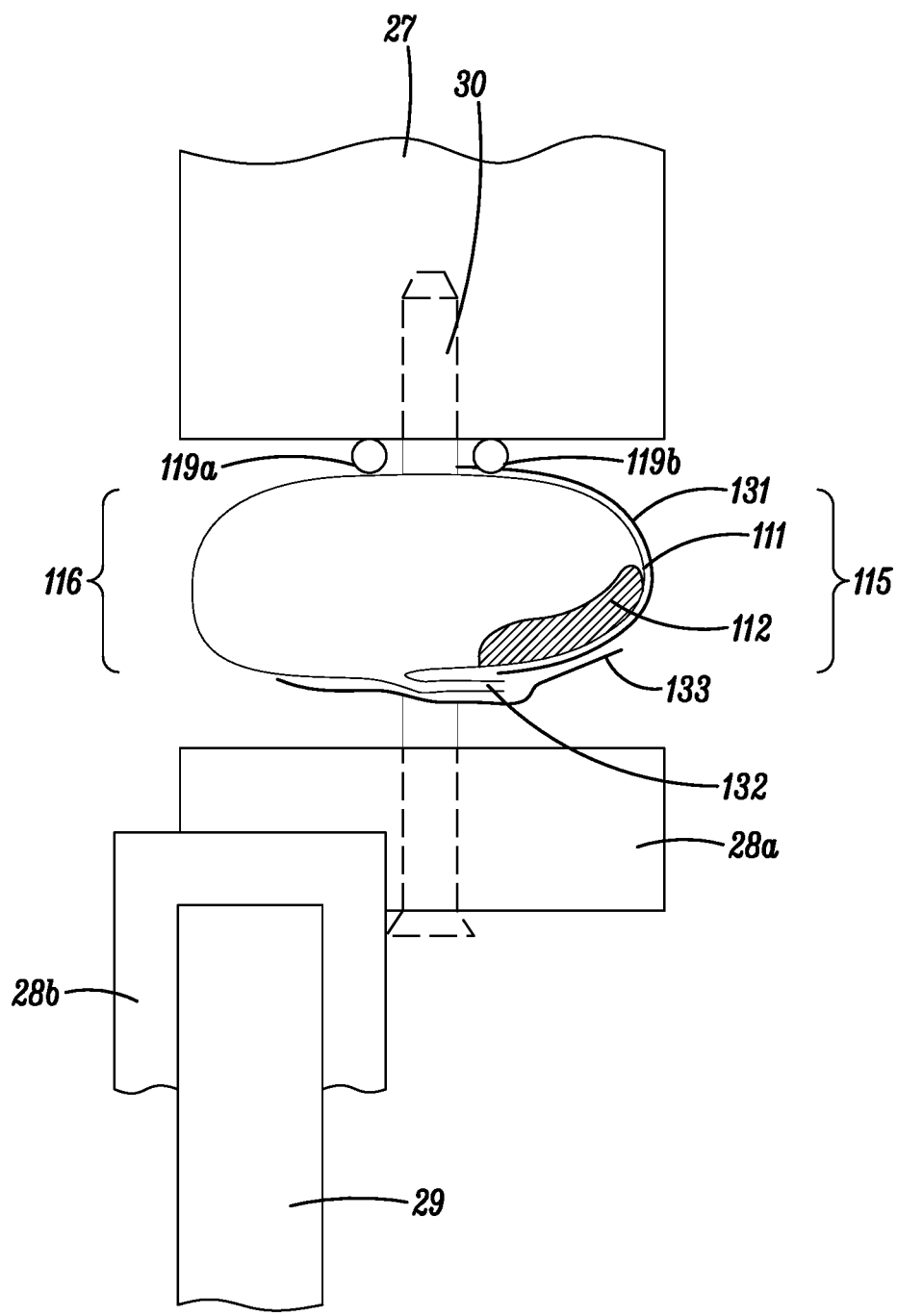
FIG. 14 is an end view of a window to building wall interface with a tube inserted into the air gap between the window and the building wall.
Figure 15:
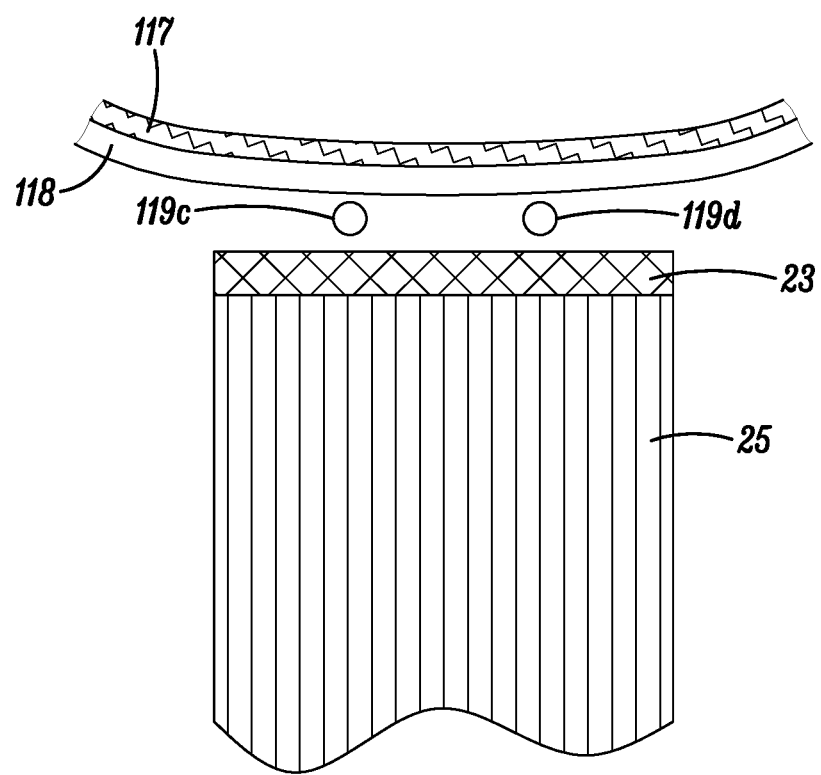
FIG. 15 is an end view of another embodiment of an article inserted into an air gap space between building interfaces.

The material of the pouch 112 is thermoplastic and, as shown in FIG. 11, has a length l and a width w, the length l being greater than the width w. The pouch 112 is located within the tube 111 such that it contacts the lower 114 and inner 115 sections of the tube. As shown in FIG. 10, the width of the pouch extends in a direction across the tube width W to an extent $W_{max}$ that is no more than 45% of the tube width W. This is a desirable feature as the pouch is offset from the centerline, helping prevent the pouch from being punctured during installation of the tube in an air gap. For example, FIG. 14 shows a typical installation where part of a building wall is shown as 27, parts of the window frame are shown as 28a and 28b with a windowpane being 29. Tube 111 is inserted between the wall 27 and window frame 28a. A fastener 30 such as nails or screws connects window frame 28a with wall 27 and holds the window assembly in place. The fastener 30 passes through tube 111 and, when present, between the two flow restrictors 119a and 119b and/or the two flow restrictors 119c and 119d. As evident by the placement of the fastener 30 in FIG. 14, by limiting the extent to which the pouch extends in a direction across the tube width W to a value where $W_{max}$ is no more than 45% of the tube width W, the risk of the fastener puncturing the pouch is eliminated.

The pouch 112 contains a foamable composition. Preferably, there are a plurality of pouches 112 within the tube 111. The spacing between adjacent pouches can vary but typically can be between 50 to 1000 mm, preferably from 400 to 600 mm and more preferably from 450 to 550 mm or even 300 to 500 mm. Preferably adjacent pouches are connected to each other by a connector such as a thermoplastic tape or ribbon.

In one embodiment, all the components of the foamable composition are in one pouch but remain inactive until a reaction initiation step is activated. Reaction initiation may be by ultrasonic energy, gas pressure blast, thermal heat or suitable frequencies in the electromagnetic spectrum such as infra-red or ultra-violet.

Figure 12:
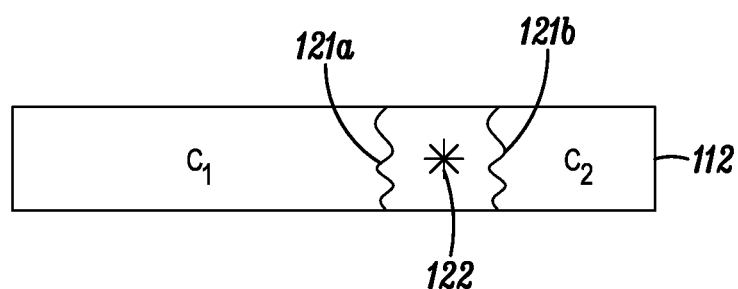
Figure 13:
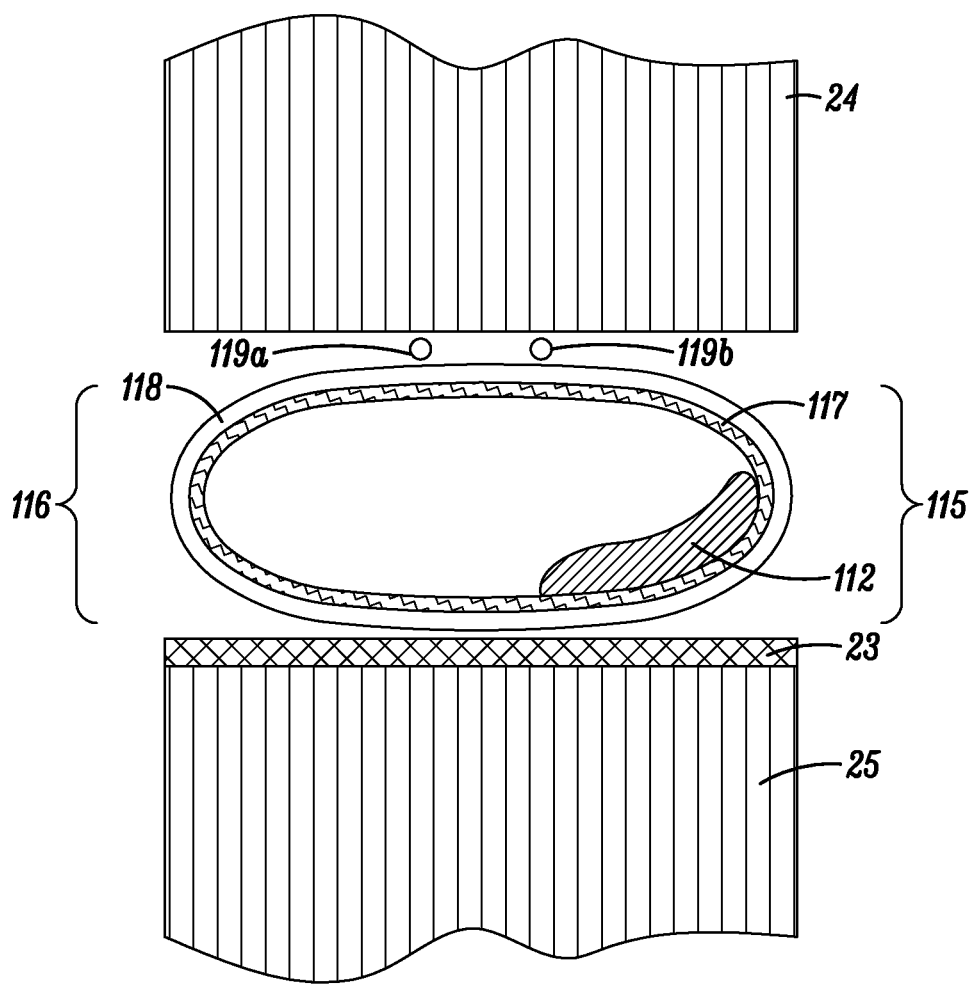
FIG. 13 is a cross-sectional view of an article inserted into an air gap space between building interfaces.

In another embodiment, as shown in FIGS. 11 and 12, the pouch 112 comprises first $C_1$ and second $C_2$ compartments, the compartments being separated by at least one frangible barrier 121 and wherein the first compartment $C_1$ contains a first foamable composition component and the second compartment $C_2$ contains a second foamable composition component. In FIG. 11, there is only one frangible barrier 121 while in FIG. 12 there are two frangible barriers 21a and 21b separating the first and second compartments.

In one embodiment, the first and second compartments $C_1$ and $C_2$ are each about 70 mm long, 30 mm wide and 12 mm thick. In some embodiments, the first and second compartments may be of different lengths. When there is a plurality of pouches, they may be of the same or differing lengths.

By frangible barrier we mean any barrier that separates the two compartments but can be easily broken to allow the chemical components of the two compartments to be intimately mixed and react to form a foam; but is durable enough to keep the contents of the two compartments separated until mixing is desired. For example, the barrier can preferably be a section of the pouch wherein the sides are lightly welded together to totally separate the contents of the two compartments; but the light weld allows the sides of the pouch to be easily separated with some light mechanical or other energy so the contents in the two compartments can mix. Alternatively, the frangible barrier can be some material that is easily sheared or broken. Suitable materials for the frangible barrier include ethylene copolymer ionomer such as Surlyn® which is available from Dow, Midland, MI. Suitable methods of breaking the frangible barrier include mechanical methods, ultrasonic methods, gas pressure blast, thermal heat, or application of suitable frequencies in the electromagnetic spectrum such as infra-red or ultra-violet. Exemplary mechanical breaking methods are hand manipulation, a hammer, roller or rod pulling.

In one embodiment as depicted in FIG. 12, there is a static mixer 122 located between the two spaced apart frangible barriers 121a and 121b that separate the first and second compartments. A static mixer is a well-known device in fluid mixing arts.

In some embodiments the pouch wall construction is a multi-layer film assembly of, for example, from 3 to 7 or from 4 to 6 components. An exemplary structure for a pouch is an ionomeric resin layer such as Surlyn®, a first adhesive or tie layer, a first polyester layer, a second adhesive or tie layer and a second polyester layer. The second polyester layer may have a metallic coating deposited on its outer surface the coating being about 30 nanometers thick. A preferred metallic material is aluminum. An alternative to the second polyester layer is a metallic foil such as aluminum having a typical thickness of about 50 micrometers.

Preferably, as shown at 132 in FIG. 14, the two circumferential edges of the pouch are sealed, such as by adhesive bonding or ultrasonic welding. Also shown in FIG. 14 is a vapor control layer or liquid sealant 131 that covers the inner section 15 of the tube 11 and partially extends onto the upper 113 and lower 114 sections of the tube 111. This vapor control layer may be made from polyethylene, ethylene vinyl alcohol copolymer (EVOH) or polyvinyl alcohol (PVOH) or a metallic foil such as aluminum.

Foamable Composition

As previously discussed herein, by foamable composition is meant a composition that when all the ingredients are combined and a reaction initiated or activated, the components of the foamable composition within the pouch 112 react to form an expandable foam, the foam then bursting the pouch 112, expanding the tube 111 and escaping through the tube holes in the upper section 113 and/or lower section 114 of the tube and between the two spaced apart flow restrictors 119a and 119b and/or 119c and 119d that extend along the length of the tube so as to fill, as in FIG. 6, the air gap 26 between the building interfaces 24 and 25 of the building structure and then cure in situ thus providing an air tight and water impermeable seal.

In an embodiment where the pouch comprises first $C_1$ and second $C_2$ compartments, the first foamable composition component in the first compartment $C_1$ comprises isocyanate and the second foamable composition component in the second compartment $C_2$ comprises polyol. The isocyanate composition may be formulated to have a monomeric diisocyanate content of less than 1 weight percent or even less than 0.1 weight percent, such formulations being well known in the trade. The second foamable composition component may further comprise a catalyst and/or a blowing agent.

In some embodiments, the composition may also comprise particles having a major dimension no greater than 1 mm to act as nuclei for cell formation thus yielding smaller pore sizes in the expanded foam. Exemplary particles are graphite, micro-balloons and calcite. For a polyurethane foam composition, these additional particles are incorporated into the second foamable composition component (polyol). Non-polyurethane two part chemistries are also suitable as foaming compositions, for example one based on an epoxy system or one based on a silicon system. In this instance the nucleating particles are kept separate from both major components until the time for mixing. This requires that these particles are located in a third compartment such as is shown between the two frangible barriers 121a and 121b in FIG. 12. Other particles may function to aid mixing of the reagents. For example, ferromagnetic or magnetic particles can enhance mixing when an external magnetic source is applied. This source may be a magnetic field or a magnetic rod. Other particles may be responsive to an external ultrasound source and in turn enhance mixing.

As in other embodiments of the article, other functionality-enabling additive can be present in the same amounts previously mentioned herein. The expanded foam thus made also preferably has the properties, including the compressibility and dimensional stability, and other features previously mentioned herein.

In some embodiments, the foamable materials contained in each pouch are the same. In some other embodiments, the foamable materials contained in one pouch are different from the foamable materials contained in another pouch, for example, some pouches may contain foamable materials that on reacting provide a foam that is of higher density but lower expansion than foams created from other pouches wherein the foamable materials contained in these other pouches are of a different chemical composition. Such a feature could reduce or even eliminate the need for mechanical fixation of windows by nails or screws.

Again, the pouch-containing invention(s) described herein finds utility in new construction or in refurbishment of existing buildings where there is a gap to be filled. Typical applications include sealing of potential air gaps between a window and wall, between a door and wall, between a wall and roof, between two walls, and gap sealing between two adjacent pre-fabricated building panels or modules. These are sometimes referred to as building interfaces.

Method of Sealing an Airgap Between Building Interfaces

In one embodiment, a method for sealing an air gap 26 between building interfaces 24 and 25 comprises the steps of:

providing an article 110 comprising a tube 111 and at least one thermoplastic pouch 112 inserted within the tube 111 wherein the tube 111 has a length L, a width W and a height H and the at least one thermoplastic pouch 112 has a length l and a width w wherein, the tube comprises an upper section 113, a lower section 114, an inner section 115, and an outer section 116, the tube comprises a tube wall having an inner layer 117 and an outer layer 118, the inner layer 117 being a semipermeable membrane that is permeable to vapors but impermeable to liquids and the outer layer 118 being a nonwoven fabric, the tube has a through-thickness direction Gurley air permeability of from 1 to 2,000 seconds, the tube has a tensile modulus in the L direction of from 300 to 450 MPa and from 200 to 320 MPa in the W direction, the tube has a plurality of holes that penetrate through the inner 117 and the outer layer 118 of the upper section 113 and/or lower section 114 of the tube, the pouch length l is greater than the width w, the pouch is located within the tube such that it contacts the lower 114 and inner 115 sections of the tube and the pouch extends in a direction across the tube width W to an extent $W_{max}$ that is no more than 45% across the tube width W, and the pouch 112 contains a foamable composition, inserting the article 110 into the air gap 26 between the building interfaces 24 and 25, activating the foamable composition within the pouch 112 so that the ingredients of the foamable composition react to form an expandable foam, the foam then bursting the pouch 112, expanding the tube 111 and escaping through the tube holes located in the upper section 113 and/or lowers section 114 of the tube and, when present, between two spaced apart flow restrictors 119a and 119b in the upper section 113 of the tube and/or two spaced apart flow restrictors 119c and 119d in the lower section 114 of the tube, the flow restrictors extending along the length of the tube, the expanding foam filling the air gap 26 between the building interfaces 24 and 25 of the building structure and then curing in situ into a foam structure that provides an air tight and water impermeable seal.

In some embodiments, the foamable materials contained in one pouch can differ from the foamable materials contained in another pouch.

An optional step in the above method is, prior to inserting the tube 111 into the air gap 26, to apply a binder to either the lower section 114 of the tube 111 or the upper surface 23 of the building interface. This binder, which may be for example a double sided tape or a hot melt adhesive, helps to hold the tube in the correct position.

In an alternative embodiment, a method for sealing an air gap 26 between building interfaces 24 and 25 comprises the steps of:

providing an article 110 comprising a tube 111 and at least one thermoplastic pouch 112 inserted within the tube 111, the pouch 112 comprising first $C_1$ and second $C_2$ compartments, the compartments being separated by at least one frangible barrier 121 or two frangible barriers 121a and 121b, wherein the tube comprises an upper section 113, a lower section 114, an inner section 115 and an outer section 116, wherein the tube comprises an inner layer 117 and an outer layer 118, the inner layer 117 being a semipermeable membrane that is permeable to vapors but impermeable to liquids and the outer layer 118 being a nonwoven fabric, the tube has a through-thickness direction Gurley air permeability of from 1 to 2,000 seconds, the tube has a tensile modulus in the L direction of from 300 to 450 MPa and from 200 to 320 MPa in the W direction, the tube has a plurality of holes that penetrate through the inner 117 and outer 118 layers of the upper section 113 and/or lower section 114 of the tube, the pouch length l is greater than the width w, the pouch is located within the tube such that it contacts the lower 114 and inner 115 sections of the tube and the pouch extends in a direction across the tube width W to an extent $W_{max}$ that is no more than 45% across the tube width W and the pouch 112 contains a foamable composition, inserting the article 110 into the air gap between the building interfaces 24 and 25, activating the foamable composition within the pouch by breaking the frangible barriers 121 or 121a and 121b separating the first $C_1$ and second $C_2$ sections of each compartment of the pouch 112 by a breaking method thereby allowing the first and second compositions to mix, react and form an expandable foam, the foam then bursting the pouch 112, expanding the tube 111 and escaping through the tube holes located in the upper section 113 and/or lower section 114 of the tube 111 and, when present, between the two spaced apart flow restrictors 119a and 119b and/or 119c and 119d that extend along the length of the tube 111 so as to fill the air gap 26 between the building interfaces 24 and 25 of the building structure and then cure in situ into a foam structure that provides an air tight and water impermeable seal.

The pouch breaking method may be mechanical energy, ultrasonic energy, gas pressure blast, thermal heat, or suitable frequencies in the electromagnetic spectrum such as infra-red or ultra-violet. Exemplary mechanical breaking methods include hand manipulation, a hammer, roller or rod pulling.

In some embodiments, the foamable materials contained in one pouch differ from the foamable materials contained in another pouch.

An optional step in the above method is, prior to inserting the tube 111 into the air gap 26, to apply a binder to either the lower section 114 of the tube 111 or the upper surface 23 of the building interface. This binder can be, for example, a double sided tape or a hot melt adhesive and helps to hold the tube in a desired position.

Test Methods

Free rise density of the foam was measured according to ASTM D7487-13: Standard Practice for Polyurethane Raw Materials: Polyurethane Foam Cup Test.

Dynamic compressive strength and compressive modulus of the foam was measured according to EN ISO 844-2021: Rigid Cellular Plastics.

EXAMPLES

All parts and percentages are by weight unless otherwise indicated. Examples prepared according to the current invention are indicated by numerical values. Control or Comparative Examples are indicated by letters. Examples 1-5 relate to an article comprising a foamable component and Examples 6-8 relate to an article utilizing a supplied foamable component.

Examples 1 to 3 and Comparative Example A

The materials of Examples 1-3 and Comparative Example A were evaluated in an air gap space between two building components. This space had nominal dimensions of a length of 4.2 m, a width of 77 mm and a thickness of 25 mm.

In Examples 1-3, the tube wall includes an outer layer of a spunbonded polypropylene sheet having a nominal areal weight of 50 gsm and an inner layer of a flash spun polyethylene sheet having a nominal areal weight of 80 gsm. The two sheets are bonded together with an ethylene vinyl acetate polymer. The tube thickness was nominally 0.42 mm, and the tube had a nominal through-thickness direction Gurley air permeability of 1630 seconds, 1632 seconds and 1632 seconds respectively for Examples 1-3.

Example 1 had 1 mm diameter holes arranged in two separated lines in a zig-zag pattern in the upper section of the tube. Example 2 had two spaced apart flow restrictors on the upper section of the tube and 2 mm diameter holes arranged in two separated lines in a zig-zag pattern in the upper section, but only in the part of the upper section between the two spaced apart flow restrictors. Example 3 was as Example 2 except that the holes had a diameter of 1 mm.

In Examples 1-3, each tube contained foamable material in the form of six pouches of Instapak® QuickRT® packaging foam from Sealed Air Corporation, Elmwood Park, NJ. Each pouch comprised two compartments separated by a frangible barrier, one compartment comprising polyol and the other compartment comprising isocyanate. Each pouch comprised 75 g of reactive material giving a total foamable composition of 450 g. The frangible barrier was broken by hand manipulation thus allowing the reagents to react and form the foam. The foam filled each tube and exited the tube radially and expanded to fill the gap, where the foam cured and hardened.

Comparative Example A represents the current state of art in the trade and consisted of injecting a one component polyurethane foam sealant into the gap and allowing the foamable material to uncontrollably expand, cure and harden. Any foam extending beyond the plane of the exterior surfaces of the two building components was removed and smoothed flush. A window tape sealant was then applied over the smoothed foam to overlap the building components. The foam amount was 375 g.

Measured installation time included preparation work, installing the pouches, foam activation or application, foam expansion and cure, finishing steps and application of flashing. Examples were considered to be satisfactory and beneficial to the trade if the installation time was 30 minutes or less. Examples 1-3 all had an installation time of less than 30 minutes while the installation time for Comparative Example A was about 60 minutes.

Examples 4 & 5 and Comparative Example B

An advantage of obtaining enhanced compressive tensile and modulus performance from the cured foam was achieved by the addition of p-aramid pulp to the foamable composition. The pulp which was DuPont merge 1K1957 had a nominal fiber diameter of 50 micrometers and fiber length of less than 1 mm. The pulp was added to the polyol component of an isocyanate-polyol foamable composition such that it comprised 0.4 (Example 4) or 0.8 weight percent (Example 5) of the composition. The isocyanate (Voronate™ M230) comprised 60 weight percent of the foamable composition with the polyol component comprising the remaining 40 weight percent. The polyol component comprised 32 weight percent of Voranol™ polyether polyol, 6 weight percent of water and 2 weight percent of catalyst. The amount of polyol was reduced by 0.4 or 0.8 weight percent in the examples comprising the p-aramid pulp. The sample without the pulp ingredient was a control example (Comparative Example B). These compositions were foamed and test coupons subjected to compression and modulus tests. The resultant values were normalized to address variations in foam density (free rise density) of the test samples.

The basis for the testing was EN ISO 844-2021. The foamed test samples were 16 mm thick and each was compressed by 3 mm. The dynamic compressive strength was determined by applying a strain of 18.75% then the compressive load was released for 60 seconds. This procedure was repeated four more times. The compressive modulus was determined as per the EN ISO 844-2021 standard. The results are shown in Table 1.

TABLE 1

| Feature | Comp. Ex B | Example 4 | Example 5 |
|---|---|---|---|
| Pulp Content (%) | 0 | 0.4 | 0.8 |
| Free Rise Density (kg/m$^3$) | 21 | 22 | 37 |
| Dynamic Compressive Strength (kPa) | 5.6 | 7.6 | 26.6 |
| Normalized Compressive Strength (kPa · m$^3$/kg) | 0.26 | 0.34 | 0.71 |
| Compressive Modulus (kPa) | 28 | 50.8 | 135.7 |
| Normalized Compressive Modulus (kPa · m$^3$/kg) | 1.33 | 2.31 | 3.66 |

Examples 6-8

A series of example tubes for Examples 6, 7 and 8 are made having the same dimensions as the ones made in Examples 1, 2, and 3, but each of these example tubes is further supplied with a number of inlet ports in the tube walls. Additionally, the example tube of Example 6 has 2 mm diameter holes arranged in two separated lines in a zig-zag pattern in the upper section of the tube but does not have two spaced apart flow restrictors. The example tube of Example 7 has the two spaced apart flow restrictors on the upper section of the tube, and 2 mm diameter holes arranged in two separated lines in a zig-zag pattern in the upper section of the tube but only in the part of the upper section between the two spaced apart flow restrictors. The example tube of Example 8 is like the example tube f Example 7 but has 1 mm diameter holes arranged in two separated lines in a zig-zag pattern in the upper section of the tube but only in the part of the upper section between the two spaced apart flow restrictors.

Example 6

The three example tubes supplied with a number of inlet ports that are one-way pinch valves (beachball-like valves) embedded in the tube walls are made. The example tubes are filled with a foamable mixture by inserting the nozzle of an aerosol can containing a foamable mixture in the pinch valve and injecting activating foam into the tube. The activating foam expands in the interior of the tube, filing the tube, and the foam continues to expand through the holes in the interior and exterior layers of the tube to the exterior of the tube. The foam further continues to expand radially from the tube on the outside of the tube to fill a volume on the exterior of the tube. All three tubes can provide volume-filling foam to seal an air gap between surfaces.

Example 7

Three other example tubes supplied with a number of inlet ports that are one-way pinch valves (beachball-like valves)

embedded in the tube walls are made. They are filled with a foamable mixture by inserting in one pinch valve the nozzle from a container containing an A-side foam formulation and inserting in another pinch valve the nozzle from a container containing a B-side foam formulation. The two A- and B-side components are separately injected into each example tube, where the sides mix and actively start foaming in the interior of the tube. The activating foam expands in the interior of the tube, filing the tube, and the foam continues to expand through the holes in the interior and exterior layers of the tube to the exterior of the tube. The foam further continues to expand radially from the tube on the outside of the tube to fill a volume on the exterior of the tube. All three example tubes can provide volume-filling foam to seal an air gap between surfaces.

Example 8

Example 7 is repeated, except the three example tubes are fitted with inlet ports that comprise flexible tubing and have a valving arrangement such as shown in FIG. 4 that can allow mixing of the foam ingredients as they are injected into the tube. The valves allow the A-side foam formulation to be supplied from its container into a first flexible tubing, and the B-side foam formulation to be supplied from its container into a second flexible tubing. At the confluence of the first and second flexible tubing, which is exterior to each example tube, the two sides mix and actively start foaming prior to entering the interior of the tube. The activating foam expands in the interior of the tube, filing the tube, and the foam continues to expand through the holes in the interior and exterior layers of the tube to the exterior of the tube. The foam further continues to expand radially from the tube on the outside of the tube to fill a volume on the exterior of the tube. All three tubes can provide volume-filling foam to seal an air gap between surfaces.

The invention claimed is:

1. An article comprising a tube having a length L, a width W and a height H,
    wherein the tube comprises an upper section, a lower section, an inner section, and an outer section, and the tube comprises a tube wall having an inner layer and an outer layer, the inner layer being a semipermeable membrane that is permeable to vapors but impermeable to liquids and the outer layer being a nonwoven fabric,
    wherein the tube has at least one inlet port integrated into the tube wall to permit the flow of fluid into the tube interior,
    wherein the tube has a through-thickness Gurley air permeability of from 1 to 2,000 seconds, and the tube has a tensile modulus in the L direction of from 300 to 450 MPa and from 200 to 320 MPa in the W direction, and
    wherein the tube has a plurality of holes that penetrate through the inner layer and the outer layer of the upper section and/or the lower section of the tube.

2. The article of claim 1 wherein the ratio of the width of the tube W to the height of the tube H is from 20:1 to 2.3:1.

3. The article of claim 1 wherein the width W and the height H of the tube are the same.

4. The article of claim 1 wherein the tube has, in the upper section or the lower section, two spaced apart flow restrictors extending along the length of the tube that are attached to the outer surface of the outer layer of the tube, and
    wherein the holes that penetrate through the inner layer and outer layer of the upper section or the lower section are restricted to that part of the upper section or lower section of the tube that is between the two spaced apart flow restrictors.

5. The article of claim 4 wherein the tube has, in both the upper section or the lower section, two spaced apart flow restrictors extending along the length of the tube that are attached to the outer surface of the outer layer of the tube, and
    wherein the holes that penetrate through the inner layer and outer layer of the upper section are restricted to that part of the upper section of the tube that is between the two spaced apart flow restrictors of the upper section, and
    wherein the holes that penetrate through the inner layer and outer layer of the lower section are restricted to that part of the lower section of the tube that is between the two spaced apart flow restrictors of the lower section.

6. The article of claim 1 wherein the inner layer of the tube is a nonwoven sheet of polyethylene plexifilaments.

7. The article of claim 1 wherein the outer layer of the tube is a nonwoven fabric of spunbonded polypropylene fiber.

8. The article of claim 1 further comprising an outlet port integrated into the tube wall to permit the flow of fluid out of the tube interior.

9. The article of claim 1 further comprising a vapor control layer or liquid sealant that covers an inner surface or an outer surface of the inner section of the tube and partially extends onto the upper and lower sections of the tube.

10. The article of claim 9 wherein the vapor control layer is polyethylene, ethylene vinyl alcohol copolymer, polyvinyl alcohol or a metallic foil.

11. A method for sealing an air gap between building interfaces, the method comprising the steps of:
    providing an article comprising a tube,
        wherein the tube has a length L, a width W and a height H, and the tube comprises an upper section, a lower section, an inner section, and an outer section, and the tube comprises a tube wall having an inner layer and an outer layer,
        wherein the inner layer is a semipermeable membrane that is permeable to vapors but impermeable to liquids and the outer layer is a nonwoven fabric,
        wherein the tube has at least one inlet port integrated into the tube wall to permit the flow of fluid into the tube interior, and
        wherein the tube has a through-thickness Gurley air permeability of from 1 to 2,000 seconds, and a tensile modulus in the L direction of from 300 to 450 MPa and from 200 to 320 MPa in the W direction, and
        the tube has a plurality of holes that penetrate through the inner and outer layers of the upper section and/or the lower section of the tube;
    inserting the article into the air gap between the building interfaces;
    injecting an activated or activatable foamable composition into the tube via the at least one inlet port, and
    either activating the foam or allowing the foam to expand, thus expanding the tube, wherein the expanding foam exits the tube through the tube holes in the upper section and/or the lower section of the tube and, when present, between spaced apart flow restrictors that extend along the length of the tube, the expanding foam filling the air gap between the building interfaces and of the building structure and then cure in situ into a foam structure.

12. The method of claim 11 wherein the foamable composition comprises an isocyanate and a polyol.

13. The method of claim 11 wherein the foamable composition further comprises a catalyst and/or a blowing agent.

* * * * *